United States Patent
Applegate et al.

(10) Patent No.: US 9,723,343 B2
(45) Date of Patent: Aug. 1, 2017

(54) CONTENT PLACEMENT

(71) Applicant: AT&T Intellectual Property I, L.P., Atlanta, GA (US)

(72) Inventors: David L. Applegate, Maplewood, NJ (US); Aaron F. Archer, South Orange, NJ (US); Vijay Gopalakrishnan, Summit, NJ (US); Seungjoon Lee, Basking Ridge, NJ (US); Kadangode Ramakrishnan, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 21 days.

(21) Appl. No.: 14/460,510

(22) Filed: Aug. 15, 2014

(65) Prior Publication Data
US 2014/0359683 A1     Dec. 4, 2014

Related U.S. Application Data

(63) Continuation of application No. 12/955,672, filed on Nov. 29, 2010, now Pat. No. 8,856,846.

(51) Int. Cl.
  *H04N 7/173*     (2011.01)
  *H04N 21/25*    (2011.01)
  (Continued)

(52) U.S. Cl.
  CPC ....... *H04N 21/252* (2013.01); *H04N 21/2225* (2013.01); *H04N 21/47202* (2013.01)

(58) Field of Classification Search
  CPC ............. H04N 21/2181; H04N 21/222; H04N 21/231; H04N 21/23103; H04N 21/23106;
  (Continued)

(56) References Cited

U.S. PATENT DOCUMENTS 5,564,021 A * 10/1996 Qiu ........................ G06F 17/509
                                                            370/431
5,652,613 A     7/1997 Lazarus et al.
(Continued)

OTHER PUBLICATIONS

"Technique for Optimal Assignment of Traffic to Routes in Telecommunication Networks," IBM Technical Disclosure Bulletin, vol. 25, Issue 11B, Apr. 1, 1983, 2 pages.
(Continued)

*Primary Examiner* — An Son P Huynh
(74) *Attorney, Agent, or Firm* — Toler Law Group, PC

(57) ABSTRACT

A method includes forecasting demand for media content items of a media distribution system based on historical demand information to generate forecasted demand. The method includes generating a mixed integer program model based on storage constraints of a plurality of distribution nodes of the media distribution system, bandwidth constraints of the media distribution system, and the forecasted demand. The method includes performing a Lagrangian relaxation operation using the mixed integer program model. The method includes determining values of a cost function based on a result of the Lagrangian relaxation operation. The method includes assigning each of the media content items to a corresponding distribution node of the plurality of distribution nodes based on the cost function and the forecasted demand.

20 Claims, 13 Drawing Sheets

(51) Int. Cl.
*H04N 21/2225* (2011.01)
*H04N 21/472* (2011.01)

(58) Field of Classification Search
CPC .. H04N 21/03116; H04N 21/24; H04N 21/25; H04N 21/251; H04N 21/252; H04N 21/2225; H04N 21/47202
USPC .............................................. 725/90–97, 46
See application file for complete search history.

(56) References Cited

U.S. PATENT DOCUMENTS

| | | | |
|---|---|---|---|
| 5,815,662 A | | 9/1998 | Ong |
| 5,862,312 A | | 1/1999 | Mann et al. |
| 5,916,303 A | | 6/1999 | Scott |
| 5,991,306 A | | 11/1999 | Burns et al. |
| 6,401,121 B1 | * | 6/2002 | Yoshida ............... G06F 9/505 348/E5.008 |
| 6,744,727 B2 | | 6/2004 | Liu et al. |
| 6,769,127 B1 | | 7/2004 | Bonomi et al. |
| 6,859,839 B1 | * | 2/2005 | Zahorjan ............... H04N 7/173 709/231 |
| 6,868,452 B1 | * | 3/2005 | Eager ............... H04N 21/23106 709/231 |
| 6,973,621 B2 | | 12/2005 | Sie et al. |
| 7,028,096 B1 | | 4/2006 | Lee |
| 7,080,400 B1 | | 7/2006 | Navar |
| 7,111,316 B1 | * | 9/2006 | Zahorjan ............ H04N 7/17309 348/E7.07 |
| 7,143,431 B1 | * | 11/2006 | Eager ................ H04L 12/1881 348/E7.07 |
| 7,155,735 B1 | | 12/2006 | Ngo et al. |
| 7,278,152 B1 | | 10/2007 | Rao |
| 7,278,153 B1 | | 10/2007 | Sanders |
| 7,283,478 B2 | * | 10/2007 | Barsheshet ............. H04L 12/42 370/238 |
| 7,404,201 B2 | | 7/2008 | Takeuchi et al. |
| 7,418,494 B2 | | 8/2008 | Dahlin et al. |
| 7,451,474 B1 | | 11/2008 | McBreen et al. |
| 7,512,558 B1 | * | 3/2009 | Elad ................... G06Q 30/0206 705/37 |
| 7,725,569 B2 | | 5/2010 | Brady, Jr. et al. |
| 7,761,900 B2 | | 7/2010 | Crayford |
| 7,801,177 B2 | | 9/2010 | Luss |
| 7,818,402 B1 | | 10/2010 | Zhang |
| 7,831,989 B1 | * | 11/2010 | Calzone ............... H04L 12/2801 370/428 |
| 7,903,652 B2 | | 3/2011 | Huang et al. |
| 8,078,489 B1 | * | 12/2011 | Marsten ................. G06Q 10/04 705/7.25 |
| 8,191,097 B1 | | 5/2012 | Armstrong et al. |
| 8,312,161 B2 | | 11/2012 | Ganesan |
| 8,447,875 B2 | | 5/2013 | Liu et al. |
| 8,464,303 B2 | | 6/2013 | Sofman et al. |
| 8,856,846 B2 | * | 10/2014 | Applegate ......... H04N 21/2225 725/86 |
| 2001/0036271 A1 | | 11/2001 | Javed |
| 2002/0059394 A1 | | 5/2002 | Sanders |
| 2002/0059621 A1 | | 5/2002 | Thomas et al. |
| 2002/0069420 A1 | | 6/2002 | Russell et al. |
| 2002/0078174 A1 | | 6/2002 | Sim et al. |
| 2002/0133491 A1 | * | 9/2002 | Sim .................. G06F 17/30067 |
| 2002/0174430 A1 | * | 11/2002 | Ellis .................... G11B 27/005 725/46 |
| 2003/0005453 A1 | * | 1/2003 | Rodriguez ......... H04N 7/17318 725/87 |
| 2003/0005457 A1 | | 1/2003 | Faibish et al. |
| 2003/0149988 A1 | | 8/2003 | Ellis et al. |
| 2003/0204856 A1 | * | 10/2003 | Buxton ............. H04N 7/17318 725/120 |
| 2004/0071089 A1 | * | 4/2004 | Bauer ................. H04Q 11/0478 370/238 |
| 2004/0103437 A1 | | 5/2004 | Allegrezza et al. |
| 2004/0220966 A1 | | 11/2004 | Ridge |
| 2004/0261094 A1 | | 12/2004 | Huslak et al. |
| 2005/0066239 A1 | * | 3/2005 | Keeton .................. G06F 11/008 714/47.1 |
| 2005/0097285 A1 | * | 5/2005 | Karamanolis ........... G06F 12/12 711/159 |
| 2005/0097286 A1 | * | 5/2005 | Karlsson ............ G06F 17/30584 711/159 |
| 2005/0137959 A1 | * | 6/2005 | Yan ....................... G06Q 20/102 705/37 |
| 2005/0147075 A1 | | 7/2005 | Terry |
| 2005/0183127 A1 | | 8/2005 | Ngo et al. |
| 2005/0261946 A1 | | 11/2005 | Howlett et al. |
| 2005/0283487 A1 | * | 12/2005 | Karlsson ............... G06F 3/0608 |
| 2005/0289618 A1 | | 12/2005 | Hardin |
| 2006/0080463 A1 | * | 4/2006 | Drew .................... H04L 45/00 709/238 |
| 2006/0089864 A1 | * | 4/2006 | Feng ..................... G06Q 10/04 705/7.24 |
| 2006/0235557 A1 | * | 10/2006 | Knight .................. G06Q 10/087 700/103 |
| 2007/0064793 A1 | * | 3/2007 | Wang .................... H04N 19/147 375/240.03 |
| 2007/0104222 A1 | * | 5/2007 | Luss .................... H04L 12/1877 370/468 |
| 2007/0107025 A1 | | 5/2007 | Li et al. |
| 2007/0154163 A1 | * | 7/2007 | Cordray ............ H04N 21/6187 386/278 |
| 2007/0157281 A1 | * | 7/2007 | Ellis .................... H04N 7/17309 725/134 |
| 2007/0186272 A1 | | 8/2007 | Hunter et al. |
| 2008/0034393 A1 | | 2/2008 | Crayford |
| 2008/0059721 A1 | | 3/2008 | Turner et al. |
| 2008/0065749 A1 | * | 3/2008 | Kucukyavuz ..... G06F 15/17375 709/223 |
| 2008/0071570 A1 | | 3/2008 | Hyde et al. |
| 2008/0072264 A1 | * | 3/2008 | Crayford ............ H04L 29/06027 725/86 |
| 2008/0115167 A1 | | 5/2008 | Hermsmeyer et al. |
| 2009/0083813 A1 | | 3/2009 | Dolce et al. |
| 2009/0100459 A1 | * | 4/2009 | Riedl ................. H04N 21/2385 725/35 |
| 2009/0133078 A1 | * | 5/2009 | Hamano ................. H04N 5/76 725/87 |
| 2009/0158362 A1 | | 6/2009 | Kajos |
| 2009/0193485 A1 | * | 7/2009 | Rieger ................ H04N 21/2402 725/114 |
| 2009/0217326 A1 | | 8/2009 | Hasek |
| 2009/0217329 A1 | * | 8/2009 | Riedl ................... H04N 7/17318 725/93 |
| 2009/0248901 A1 | | 10/2009 | Medin, Jr. |
| 2009/0292629 A1 | * | 11/2009 | Lynch ................... G06Q 10/04 705/30 |
| 2010/0031162 A1 | * | 2/2010 | Wiser ................ G06Q 30/0255 715/747 |
| 2010/0071012 A1 | * | 3/2010 | Sofman ............... H04N 7/17336 725/109 |
| 2010/0148940 A1 | * | 6/2010 | Gelvin ..................... H04L 67/12 340/286.02 |
| 2010/0153575 A1 | | 6/2010 | Liu et al. |
| 2010/0186025 A1 | | 7/2010 | Thomas et al. |
| 2011/0055347 A1 | | 3/2011 | Hu et al. |
| 2011/0078717 A1 | * | 3/2011 | Drummond ........ H04N 21/4586 725/14 |
| 2011/0099332 A1 | * | 4/2011 | Sofman ............... H04N 21/2225 711/118 |
| 2011/0255555 A1 | | 10/2011 | Alexander |
| 2011/0279311 A1 | * | 11/2011 | Hamano ............ G06F 17/30241 342/357.25 |
| 2012/0137336 A1 | | 5/2012 | Applegate |
| 2012/0291076 A1 | | 11/2012 | Armstrong et al. |
| 2013/0013731 A1 | | 1/2013 | Ree et al. |
| 2013/0276040 A1 | | 10/2013 | Ganesan |
| 2013/0329650 A1 | | 12/2013 | Cui et al. |
| 2014/0157337 A1 | | 6/2014 | Gopalakrishnan et al. |

(56) References Cited

OTHER PUBLICATIONS

Agarwal, S. et al., "Volley: Automated Data Placement for Geo-Distributed Cloud Services," In Proceedings of Usenix NSDI, 2010, 16 pages.
Alzoubi, H.A. et al., "Anycast CDNs Revisited," Proceedings of the 17th International Conference on World Wide Web, 2008, 10 pages.
Applegate, D. et al., "Optimal Content Placement for a Large-Scale VoD System," AT&T Labs Research, Nov. 8, 2010, pp. 1-22.
Asur, S. et al., "Predicting the Future With Social Media," Proceedings of the 2010 IEEE/WIC/ACM International Conference on Web Intelligence and Intelligent Agent Technology, vol. 1, Mar. 2010, 8 pages.
Baev, I. et al., "Approximation Algorithms for Data Placement Problems," SIAM Journal on Computing, vol. 38, Issue 4, Jul. 2008, pp. 1-18.
Barbir, A. et al., "Known Content Network (CN) Request-Routing Mechanisms," Network Working Group Request for Comments: 3568, Category: Informational, Jul. 2003, pp. 1-20.
Bienstock, D., "Potential Function Methods for Approximately Solving Linear Programming Problems: Theory and Practice," Aug. 21, 2001, 104 pages.
Borst, S. et al., "Distributed Caching Algorithms for Content Distribution Networks," Proceeding of IEEE INFOCOM, 2010, 10 pages.
Byrka, J. "An Optimal Bifactor Approximation Algorithm for the Metric Uncapacitated Facility Location Problem," SIAM Journal on Computing, vol. 39, No. 6, 2010, 11 pages.
Cha, M. et al., "I Tube, You Tube, Everybody Tubes: Analyzing the World's Largest User Generated Content Video System," Proceedings of ACM IMC, 2007, 13 pages.
Fan, L. et al., "Summary Cache: A Scalable Wide-Area Web Cache Sharing Protocol," IEEE/ACM Transactions on Networking, vol. 8, No. 3, Jun. 2000, pp. 281-293.
Fisher, M.L., "The Lagrangian Relaxation Method for Solving Integer Programming Problems," Management Science, vol. 27, No. 1, Jan. 1981, 19 pages.
Garg, N. et al., "Faster and Simpler Algorithms for Multicommodity Flow and Other Fractional Packing Problems," SIAM Journal on Computing, vol. 37, No. 2, 2007, pp. 1-22.
Geoffrion, A.M., "Lagrangian Relaxation for Integer Programming," Chapter 9, 50 Years of Integer Programming, 1958-2008, pp. 243-281.
Guo, L. et al., "Does Internet Media Traffic Really Follow Zipf-like Distribution?" Proceedings of ACM Sigmetrics, 2007, 2 pages.
Huang, C. et al., "Can Internet Video-On-Demand Be Profitable?" Proceedings of ACM Sigcomm, 2007, 12 pages.
Koren, Y., "Factorization Meets the Neighborhood: A Multifaceted Collaborative Filtering Model," Proceedings of ACM KDD, 2008, 9 pages.
Lee, D. et al., "LRFU: A Spectrum of Policies That Sumsumes the Least Recently Used and Least Frequently Used Policies," IEEE Transactions on Computers, vol. 50, No. 12, Dec. 2001, pp. 1352-1361.
Qui, L. et al., "On the Placement of Web Server Replicas," Proceedings of IEEE Infocom, 2001, 10 pages.
Spring, N. et al., "Measuring ISP Topologies With Rocketfuel," IEEE/ACM Transactions on Networking. vol. 12, No. 1, Feb. 2004, pp. 2-16.
Valancius, V. et al., "Greening the Internet With Nano Data Centers," Proceedings of ACM CoNext, 2009, 12 pages.
Zhao, Y. et al., "Network Bandwidth Requirements for Scalable On-Demand Streaming," IEEE/ACM Transcations on Networking, vol. 15, No. 4, 2007, pp. 1-10.
Zhou, X. et al., "Optimal Video Replication and Placement on a Cluster of Video-On-Servers," Proceedings IEEE International Conference on Parallel Processing, 2002, 9 pages.

* cited by examiner

ND PLACEMENT

CLAIM OF PRIORITY

The present application claims priority from, and is a continuation of U.S. patent application Ser. No. 12/955,672, filed Nov. 29, 2010, the content of which is incorporated by reference herein in its entirety.

FIELD OF THE DISCLOSURE

The present disclosure is generally related to content placement in a set of nodes connected by a network.

BACKGROUND

Certain service providers that offer Video-on-Demand (VoD) content use servers at metropolitan offices (e.g., Video Hub Offices (VHOs)) to store all of the videos in their library. Content and network service providers are facing substantial growth in the demand for VoD content. With the rapid increase in library sizes, it may become burdensome or infeasible to replicate the entire library at each metropolitan office. Each of these VHOs may have a large number of servers to store and serve videos. Further, these VHOs may be inter-connected using a high-bandwidth backbone. To deal with the high demand, a provider may replicate the entire library at each VHO. This may allow the provider to circumvent problems such as content popularity prediction and overload due to flash crowds.

Despite disk space being plentiful and affordable, replicating the entire library at each VHO may be economically burdensome or infeasible. The cost of a gigabyte of storage may be decreasing; however, the video libraries are also growing. The rate of creation of content, the ever-increasing demand for high-quality content (e.g., high-definition, 3-D video), and the space needed to store the content appears to be outpacing the ability of providers to economically add storage and replicate content at each office.

DETAILED DESCRIPTION

Figure 1:
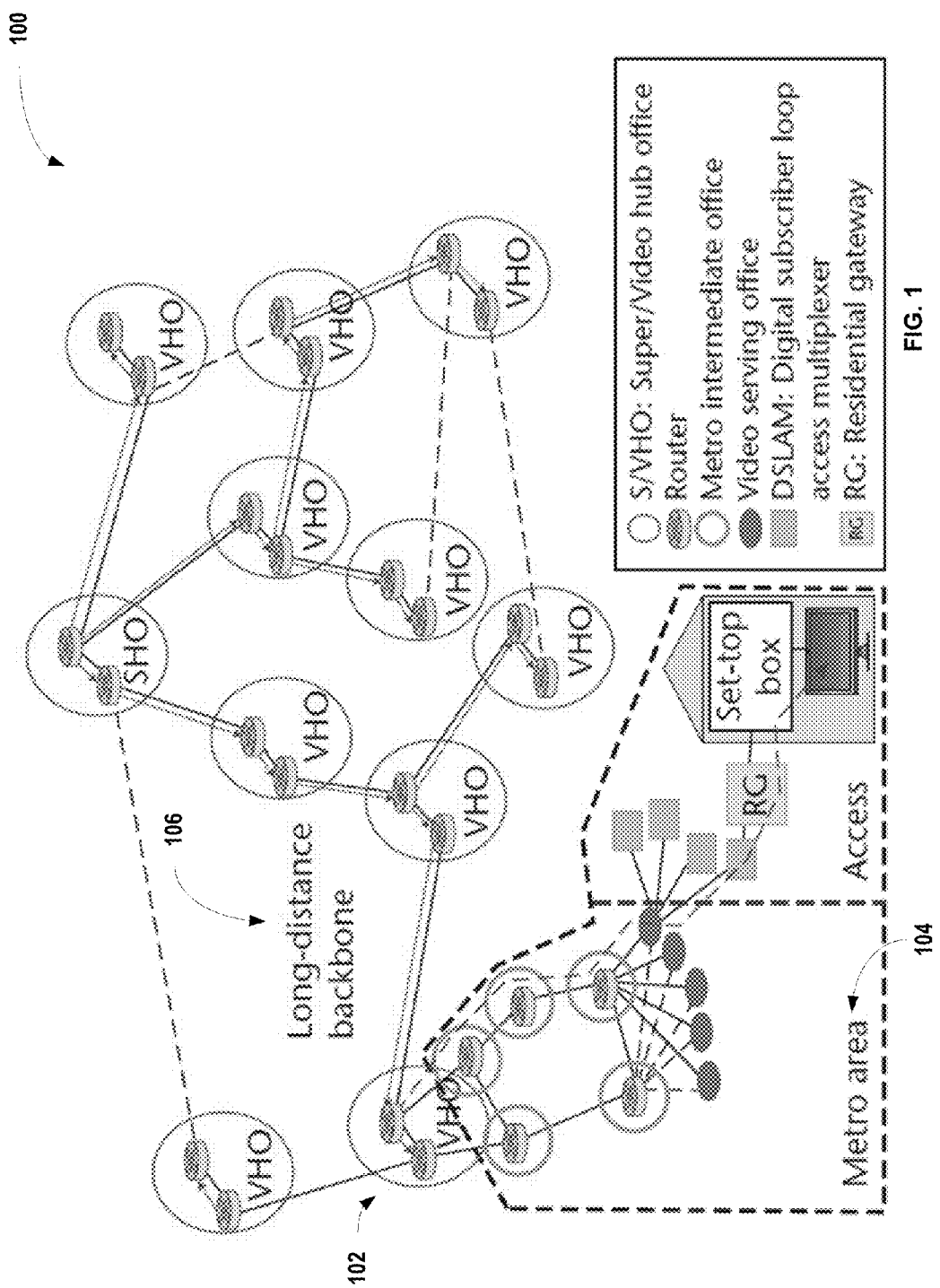
FIG. 1 is a diagram of a particular embodiment of an architecture for a content distribution service.

Content placement may be challenging and using simple cache replacement policies alone may not suffice. In a particular embodiment, a computer-implemented method includes receiving data identifying new media content items to be added to a media distribution system that provides media content on demand to a plurality of endpoints. The media distribution system includes a plurality of distribution nodes, and each of the distribution nodes is coupled to a subset of the endpoints. The method includes determining historical demand during a particular time period for existing media content items. Existing media content items refers to content available items that were available via at least one of the distribution nodes before the data identifying the new media content items was received. The method includes forecasting demand for media content items of the media distribution system based on the historical demand. The media content items include the new media content items and the existing media content items. The method includes assigning each of the media content items to at least one corresponding distribution node based at least partially on a cost function and the forecasted demand. The method further includes storing each of the new media content items at the at least one corresponding distribution node.

In another particular embodiment, a system includes a processor and memory accessible to the processor. The memory (e.g., a non-transitory computer-readable medium) includes instructions that, when executed by the processor, cause the processor to receive data identifying new media content items to be added to a media distribution system that provides media content on demand to a plurality of endpoints. The media distribution system includes a plurality of distribution nodes, where each of the distribution nodes is coupled to a subset of the endpoints. The instructions cause the processor to determine historical demand during a particular time period for existing media content items. Each of the existing media content items includes content available via at least one of the distribution nodes before the data identifying the new media content items was received. The instructions cause the processor to forecast demand for media content items of the media distribution system based on the historical demand. The media content items include the new media content items and the existing media content items. The instructions cause the processor to assign each of the media content items to at least one corresponding distribution node based at least partially on a cost function and the forecasted demand. The instructions further cause the processor to store each of the new media content items at the at least one corresponding distribution node.

The present disclosure describes an approach for intelligent content placement that scales to large library sizes (e.g., hundreds of thousands of videos). A mixed integer program (MIP) may be utilized to take into account constraints such as disk space, link bandwidth, and content popularity. To overcome the challenges of scale, a Lagrangian relaxation-based decomposition technique may be utilized in combination with integer rounding. The technique may find a near-optimal solution (e.g., within 1-2%) with orders of magnitude speedup relative to solving even the linear programming (LP) relaxation via standard software. The present disclosure also describes strategies to address practical issues such as popularity estimation, content updates, short-term popularity fluctuation, and frequency of placement updates. Using traces from an operational system, it may be shown that embodiments disclosed herein can significantly outperform simpler placement strategies. For instance, the MIP-based solution may enable serving the same number of requests while using only half the link bandwidth used by least recently used (LRU) or least frequently used (LFU) cache replacement policies. The present disclosure also addresses trade-offs between disk space and network bandwidth.

Multiple studies have observed "long tail" properties in the popularity of videos, meaning that a large number of videos are requested infrequently. Hence, storing copies of these videos in all locations may be considered overkill. In a particular embodiment, Video Hub Offices (VHOs) of a content distribution system may be treated as part of a large distributed store. Videos may be distributed among the VHOs such that all users' requests can be served efficiently. Placing video content in large scale can be quite challenging and may benefit from predicting what content is going to be popular, when it is going to be popular, and where it is going to be requested most.

One approach is to take advantage of the skew in request popularity and use caches, as in applications such as DNS and Web. When using caches, each video is replicated at a few locations. When a requested video is locally unavailable (i.e., a cache miss), the video is fetched from a remote location that has a copy, and is then cached locally. When the cache at a location is full, videos may be replaced using a replacement policy. Thus, caches allow the system to dynamically adjust the number of copies of videos according to their current popularity. Caching, however, may be dependent on the size and stability of the working set (i.e., items being actively accessed at a given time). A cache miss may impose a significant burden on the system in the context of VoD, as the cache miss results in transfer of a high-bandwidth stream from a remote location/node for an extended period of time. Further, a video being viewed may be retained in the cache for the length of the video, thereby occupying the cache for a long period. As described below, the working set size can be quite large in typical VoD deployments and may change over time. As such, the caches may be fairly large in order for them to be useful over long periods.

Another approach to video content placement is to employ optimization-based techniques. However, many existing schemes are based on simplifying assumptions that may be unrealistic (e.g., same demand pattern from all locations), rely on a particular class of networks (e.g., tree topology), or use heuristics to make the problem tractable. Also, many existing schemes do not consider link capacity constraints, which may be an important aspect in delivering high-quality videos for an extended period of time. Without link bandwidth constraints, the problem is a facility location problem. Adding bandwidth constraints introduces the aspect of multicommodity flow, which can make the models computationally more difficult. As such, a general framework that can scalably find a placement solution optimized for all the videos in the library across all locations with an arbitrary network topology and video demand pattern is disclosed herein.

In a particular embodiment, videos are pre-positioned so as to reduce or minimize system resource usage while serving all requests and satisfying all disk and link capacity constraints. The present approach also enables exploration of the trade-off between the disk capacity requirement at each VHO and bandwidth. When a requested video is not available locally, the high-speed backbone may be utilized to satisfy the request from a remote VHO.

A mixed integer programming (MIP) formulation is used to determine the placement of videos. The solution of the MIP determines how many copies of each video are needed and where each copy should be placed so as to reduce or minimize the total network bandwidth consumption. However, due to the scale of the problem, even linear programming (LP) relaxation of the MIP may be too large for off-the-shelf software to find an optimal solution within a reasonable time. For instance, in one simulation, it took a state-of-the art off-the-shelf software program more than 10 days to optimally solve an instance with five thousand videos and 55 VHOs. The present approach employs a decomposition technique based on Lagrangian relaxation. Using this approach, a near-optimal LP solution may be obtained orders of magnitude faster. A rounding heuristic may be used to convert the near-optimal LP solution into a solution for the MIP.

A number of simple strategies to address practical issues are disclosed. Specifically, the MIP uses the demand for each video as an input. Request history may be used to predict the demand for videos. This, however, may only enable prediction of demand for videos already in the library. In the present disclosure, a strategy is disclosed that identifies a similar video in the past (e.g., same TV series show) and uses the request history of similar existing video to predict the demand for a new video. Experimental results show that this strategy can be effective. To overcome errors in the prediction, including unexpected flash crowds, a relatively small least recently used (LRU) or least frequently used (LFU)-cache may be provided at each location (in addition to the copies of content that are placed at the node).

Simulations using real trace data from a nationally deployed VoD service and synthetic trace data generated from web crawls have been performed. Results indicate that the disclosed approach may outperform existing caching schemes. For the same amount of disk space, the disclosed approach may use a little more than half the peak bandwidth as a LRU or LFU schemes. The total number of bytes transferred may also be significantly lower. The results also indicate that the disclosed approach may scale well and can be used in practice to place libraries with hundreds of thousands of videos.

System Environment

Referring to FIG. 1, an architecture for a network of a content distribution service is illustrated and is designated 100. The content distribution service may include an Internet Protocol Television (IPTV) service, a cable television service, a satellite television service, or another service that provides Video on Demand (VoD) content. The network may include offices (i.e., VHOs 102) in multiple metropolitan areas 104 that are connected via a high-bandwidth backbone 106. Each VHO 102 may cover one or more cities. The term "metro area" 104 may describe all of the cities serviced by a single office 102. Each of the VHOs 102 has a certain amount of storage, which may be the same across all VHOs 102 or may vary based on the size of the metro area 104.

Each VHO 102 may have storage space to hold only a subset of the videos offered through the catalog of video content of the content distribution service. Each VHO 102 receives and satisfies all the requests from users in its metro area 104. In case a video is not available at the local VHO 102, the content distribution service has the ability to deliver the video from a remote VHO to satisfy the user's request transparently. A pre-determined path may be used to send the video between the VHOs 102 (e.g., based on shortest path routing).

The links between VHOs 102 need not be dedicated for the VoD service and may be shared with other services. Similarly, only a portion of storage space may be available for the VoD service. Hence, it may be beneficial to find an optimal or near-optimal operating point which balances the trade-off between the amount of storage space used and the amount of network bandwidth needed, while satisfying all requests. Also note that while embodiments disclosed herein are described with reference to a typical architecture, such as the architecture illustrated in FIG. 1, the solutions presented are applicable to a content delivery network (CDN) setting where a user's request can be dynamically directed to any CDN location.

Figure 2:
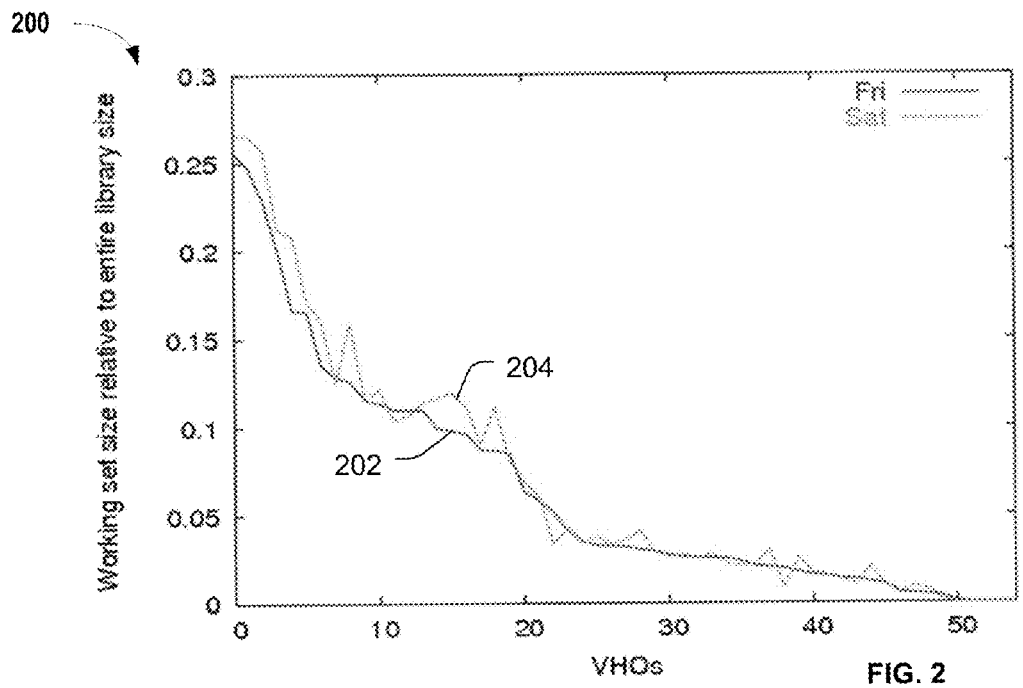
FIG. 2 is a graph illustrating sample working set data during peak hours.

Referring to FIG. 2, illustrative sample data associated with working set sizes during peak hours is illustrated and is designated 200. FIG. 2 illustrates the number of distinct videos that are requested from each VHO (i.e., the "working set") during the peak hour of a Friday 202 and a Saturday 204 (typically the two busiest days of the week). The working set size (disk space) for certain VHOs may be large compared to the entire library size. In one embodiment, the maximum working set size may be approximately 25% of the entire library, and about 10 of the VHOs receive requests for approximately an eighth of the library size. Thus, a proportionally large cache may be used to store these videos. A simple LRU cache replacement policy may not be adequate, and such a cache replacement policy may have an adverse effect on the miss ratio.

Time-Varying Demand Pattern

Based on VoD request traces, the demand pattern for videos at each VHO may significantly change even over short periods of time. To quantify this (relatively rapid) change in request pattern, a cosine similarity metric may be used. Given two vectors $v_1$ and $v_2$, the cosine similarity is $$\frac{v_1 \cdot v_2}{|v_1||v_2|}.$$

The value is between zero (0) and one (1), with 1 indicating that the two vectors are alike. For a given time window size, the entire time duration may be partitioned into multiple intervals (e.g., of the same size). For each interval, the request pattern at a VHO may be modeled as a vector composed of the request count for each video during the interval.

Figure 3:
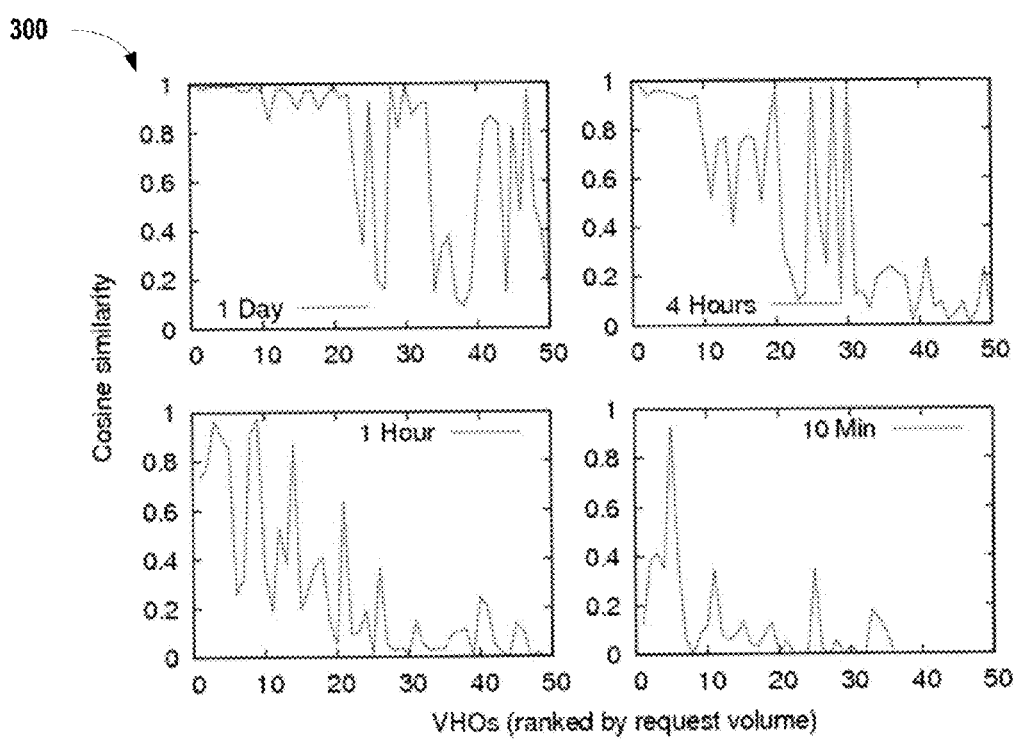
FIG. 3 is a graph illustrating sample data related to similarity in videos requested during different time windows.

Referring to FIG. 3, illustrative sample data associated with similarity in videos requested during different time windows is illustrated and is designated 300. In FIG. 3, the cosine similarity between the vector for the interval containing the peak demand instant and the vector for the previous interval may be calculated for each VHO. The time window size may also be varied to change the aggregation time granularity. While the request mix may be similar across days, there may be significant differences in the request mix as the time window size decreases. This indicates that caches employing simple replacement policies are to be provisioned to avoid significant 'cycling' of the cache. Cycling the cache may occur in a circumstance in which a set of content items are stored in the cache and as a new content item is added to the cache, an old content item is removed from the cache. When new content items are added to the cache rapidly, old content items may be removed from the cache after being used to serve only a few requests, or even one request, which is referred to as "cycling" the cache. When each content item is only used to serve a single request, there may be no benefit to caching the content items.

MIP Formulation

In this section, the mixed integer program (MIP) is formulated that is used to determine the optimal content placement. Given a predicted request pattern for each video at each VHO over a time period, the MIP may be used to find a video placement that reduces or minimizes the total network consumption while satisfying user requests within the link bandwidth and disk capacity constraints.

Input Parameters

Table 1 summarizes the symbols used and their meaning. The top section lists the input parameters, which the MIP may treat as fixed.

TABLE 1

Input parameters and decision variables used in the MIP

| Parameter | Meaning |
| --- | --- |
| V | set of VHOs (vertices) |
| L | set of directed links |
| M | set of videos (mnemonic: movies) |
| T | set of time slices |
| $D_i$ | disk capacity at i∈V (in GB) reserved for fixed storage |
| $s^m$ | size of video m∈M (in GB) |
| $P_{ij}$ | set of links on path used by i∈V to serve requests at j∈V |
| $B_l$ | capacity of link l∈L (in Mbps) |
| $r^m$ | bitrate of video m∈M (in Mbps) |
| $a_j^m$ | aggregate # of requests for video m∈M at VHO j∈V |
| $f_j^m(t)$ | # of requests for video m∈M at VHO j∈V that are active at time t∈T |
| $c_{ij}$ | cost of transferring one GB from i∈V to j∈V |
| Decision Variable | |
| $y_i^m$ | binary variable indicating whether to store video m∈M at VHO i∈V |
| $x_{ij}^m$ | fraction of requests for video m∈M at j∈V served by i∈V |

Referring to Table 1, let V denote the set of VHO locations, L the set of directed links connecting pairs of these locations, and M the set of videos in a VOD catalog or library. The set of time slices at which the link bandwidth constraints is enforced is T. Each VHO i has disk capacity $D_i$, and the size of video m is $s^m$. For each pair of VHOs i,j∈V, there may be a fixed directed path $P_{ij}$ from i to j. For the purposes of the MIP, only the set of links used in the path matters (not their order), thus $P_{ij} \subseteq L$. Serving a request locally requires no links, so $P_{ii}=\emptyset$. The capacity of link l∈L is $B_l$, while the bit rate of video m∈M is $r^m$ (both in Mbps). For each video m∈M, VHO j∈V receives $a_j^m$ requests during the entire modeling period, but at any given time slice t∈T, the number of concurrent streams is $f_j^m(t)$. This includes not only the requests initiated at time t, but also those that start before t and are still being streamed. The cost of serving one gigabyte (GB) of video from i to j may be denoted by $c_{ij}$. In a particular scenario, the cost of remote service is proportional to the number of hops between i and j. In this case:

$$c_{ij} \alpha |P_{ij}| + \beta, \qquad (1)$$

where $|P_{ij}|$ denotes the hopcount from VHO i to VHO j, α the cost of transferring video over any single link in L, and β a fixed cost for serving a request locally at any VHO (e.g., lookup cost). While the values of α and β may, in practice, take into account the monetary cost of storing and transferring the video, as explained below, the actual values do not affect which solution is optimal with respect to this model.

MIP Model

An illustrative embodiment of the MIP model has two types of decision variables. For each VHO i∈V and each video m∈M, $y_i^m$ is a binary variable indicating whether to store m at i (i.e., yes, if $y_i^m=1$; no, if $y_i^m=0$). When a request for video m arrives at VHO j, it is served locally if the video is stored at j; otherwise, it is fetched from some other VHO storing m. If there are multiple such VHOs, then j indicates which VHO to use. The variable $x_{ij}^m$ tells what fraction of requests should be served from VHO i. In the event that the $\{x_{ij}^m\}_{i \in V}$ are strictly fractional for some m∈M, j∈V, there may be multiple approaches to implement it in practice (e.g., weighted round-robin, interleaving, etc.). For simplicity, a server i (that has video m) may be selected at random with probability $x_{ij}^m$ with the entire video m fetched from i. If $x_{ij}^m=1$, this means that j serves the requests itself (because it has the content locally).

One objective for the content placement problem is to minimize or reduce the cost of the total byte transfer, subject to disk space and link bandwidth limits. This can be formulated as the following MIP:

$$\min \sum_{m \in M} \sum_{i,j \in V} s^m d_j^m c_{ij} x_{ij}^m \qquad (2)$$

$$\text{s.t.} \sum_{i \in V} x_{ij}^m = 1, \forall m \in M, j \in V \qquad (3)$$

$$x_{ij}^m \leq y_i^m, \forall i, j \in V, m \in M \qquad (4)$$

$$\sum_{m \in M} s^m y_i^m \leq D_i, \forall i \in V \qquad (5)$$

$$\sum_{m \in M} \sum_{\substack{i,j \in V: \\ l \in P_{ij}}} r^m f_j^m(t) x_{ij}^m \leq B_l, \forall l \in L, t \in T \qquad (6)$$

$$x_{ij}^m \geq 0, \forall i, j \in V, m \in M \qquad (7)$$

$$y_i^m \in \{0, 1\}, \forall i \in V, m \in M \qquad (8)$$

The objective expressed by (2) is to minimize the overall cost of serving all the requests, in terms of network consumption, for the entire period. Constraint (3) ensures that the total fraction of requests served locally and remotely is 1, for each <video, VHO> pair. Constraint (4) indicates that location i can serve video m only when location i stores a copy locally. Constraint (5) reflects the limited disk space at each VHO, while constraint (6) captures the bandwidth limit for each link at each time slice. Constraint (7) indicates that the fraction value for x is non-negative. Constraint (8) is included because either the entire video or none of it is stored at a VHO. Breaking up videos into chunks and storing their pieces in separate locations may be accomplished by treating each chunk as a distinct element of M. Constraints (3) and (4) combine to ensure that every video is stored in at least one VHO. (That is, they imply $$\sum_{i \in V} y_i^m \geq 1,$$

∀m∈M). In a particular embodiment, the above described constraints can be considered and accounted for concurrently to determine placement of media content items.

Cost Coefficients May have Little Impact

In (1), two coefficients α and β are introduced for the cost of serving content. Since all feasible solutions satisfy Constraint (3), these cost coefficients have no impact on the optimal solution to be model, provided α>0. Two LP instances $LP_1$ and $LP_2$ are defined to be equivalent if they have the same set of feasible solutions and the same set of optimal solutions.

Proposition 1

If two LP instances differ only in the values of the cost coefficients α and β (with α>0), then they are equivalent instances.

Proposition 2

The set of optimal solutions is independent of the values α and β in (1), provided α>0.

Transfer Cost Due to Video Placement

The above objective function (2) only considers transfer cost due to video requests. However, realizing a placement solution may involve transferring videos to the location. In a particular placement solution, i stores a copy of video m. There may be an origin o for all videos, and the transfer cost between o and i may be $c_{oi}$. This cost may be accounted for by including a second term in the objective function:

$$\sum_{m \in M} \sum_{i,j \in V} s^m d_j^m c_{ij} x_{ij}^m + w \sum_{m \in M} \sum_{i \in V} s^m c_{oi} y_i^m, \qquad (9)$$

where w is a parameter that allows a different weight to be given to the additional transfer cost. For example, with w=0, (9) reduces to (2), and with w=1, the transfer due to placement is treated the same as any transfer due to a user request. Note that the initial placement of videos into the library is done before being made available to users. This can be achieved in multiple ways (e.g., using DVDs or using spare capacity, without regard to real-time deadlines). However, incremental updates to implement a new solution can potentially incur considerable cost. Equation (9) may be used to evaluate the impact.

Finding a Fractional Solution

As mentioned above, finding an optimal solution to the above MIP is NP-hard. In a particular embodiment, the LP obtained by relaxing the integral constraint (8) to be just $y_i^m \geq 0$, is solved allowing fractional values for $y_i^m$. Then, based on the fractional solution, a rounding heuristic is applied to obtain an integer solution, as described below.

Although LPs can be solved in polynomial time, the instances may be too large to solve efficiently even with a state-of-the-art commercial LP solver. To overcome this challenge, an approach based on a potential function method may be used, where the approach computes a solution to the LP that strictly satisfies all of the constraints and achieves an objective value that is provably within 1% of optimal.

Lagrangian relaxation may be used to relax the disk space and link bandwidth constraints ((5) and (6)) and these terms may be incorporated into the objective function using Lagrangian multipliers. This causes the LP to decompose into multiple independent (fractional) uncapacitated facility location problems, one for each video. The Lagrangian multipliers may be exponential in the violations of the relaxed constraints, and may also be used to define a potential function that is minimized using gradient descent. A particular embodiment may iteratively find solutions to the 1-video sub-problems and update the overall solution and Lagrangian multipliers, using a line search to improve the potential function. In addition, after every fixed number of ordinary iterations, a subset of variables with non-negligible values may be identified in the overall solution. Then, a feasible fractional solution may be determined from a restricted version of the original LP consisting of only those variables, which is typically much smaller than the full LP. Also, by using the optimal dual variables from the restricted LP, lower bounds can be obtained that allow for checking how close the current solution is to optimal and terminating if the gap is within the desired 1%.

In the simulation of the 55 VHOs and five thousand videos described above, while a state-of-the art off-the-shelf software program used over 100 GB and yet could not solve in 10 days, a particular embodiment of code may use 1 GB and take about 1 hour to find a feasible fractional solution whose objective is within 1% of optimal. Both experiments were run on a machine with a 64-bit 1.5 GHz Itanium processor and 256 GB of memory.

Rounding

Based on the fractional solution, the fractional $y_i^m$ is rounded to integer values by sequentially solving a MIP for each video m, processed in order of decreasing total demand. If all of the $y_i^m$ for video m are already integers, the $y_i^m$ and $x_{ij}^m$ are unchanged. Otherwise they are replaced with the solution to a MIP which minimizes the cumulative increase (over the videos processed so far) in the disk (5), link bandwidth (6), and objective (2), while enforcing the service constraints (3) and (4) and variable bounds (7) and (8). (Since a goal is to minimize the exceedence over the disk and link capacity limits as well as the fractional solution objective, a decrease is not rewarded, but an increase is penalized). Since the impact of rounding $y_i^m$ on the disk constraint (5) depends significantly on the video size $s^m$, separate cumulative increases for each value of $s^m$ may be maintained. If there are a large number of distinct video sizes, the videos may be grouped into buckets of similar size, and the cumulative increases may be maintained separately for each bucket.

This MIP for rounding video m is an (integer) uncapacitated facility location problem with piecewise-linear costs. Even though these MIPs are NP-hard, they may be easy to solve in practice. In a typical case, the entire rounding process, solving an MIP for every video m with a fractional $y_i^m$, took about 5 minutes, compared to 1-2 hours for solving the LP. Also, although there is no guarantee for the performance of this rounding heuristic, it only leads to around 1-2% overage for disk, link bandwidth, and the objective when compared to the fractional solution for the instances studied.

Demand Estimation

In a particular embodiment, the MIP formulation uses the demand for videos to compute placement. The demand, however, is not known a priori. One approach is to use the recent history (e.g., the past 7 days) as a guide to future demand for the videos. This history may be used as an input to one formulation.

While history is available for existing videos, new videos are added to the library continually. Further, many such newly added videos may receive a significant number of requests. Hence, placement of new content into the system is also addressed. A simple estimation strategy may be used to estimate demand for such new videos. It is based on the observation that a significant number of the newly added videos belong to TV series, and that videos from a TV series exhibit similar demand patterns.

Figure 4:
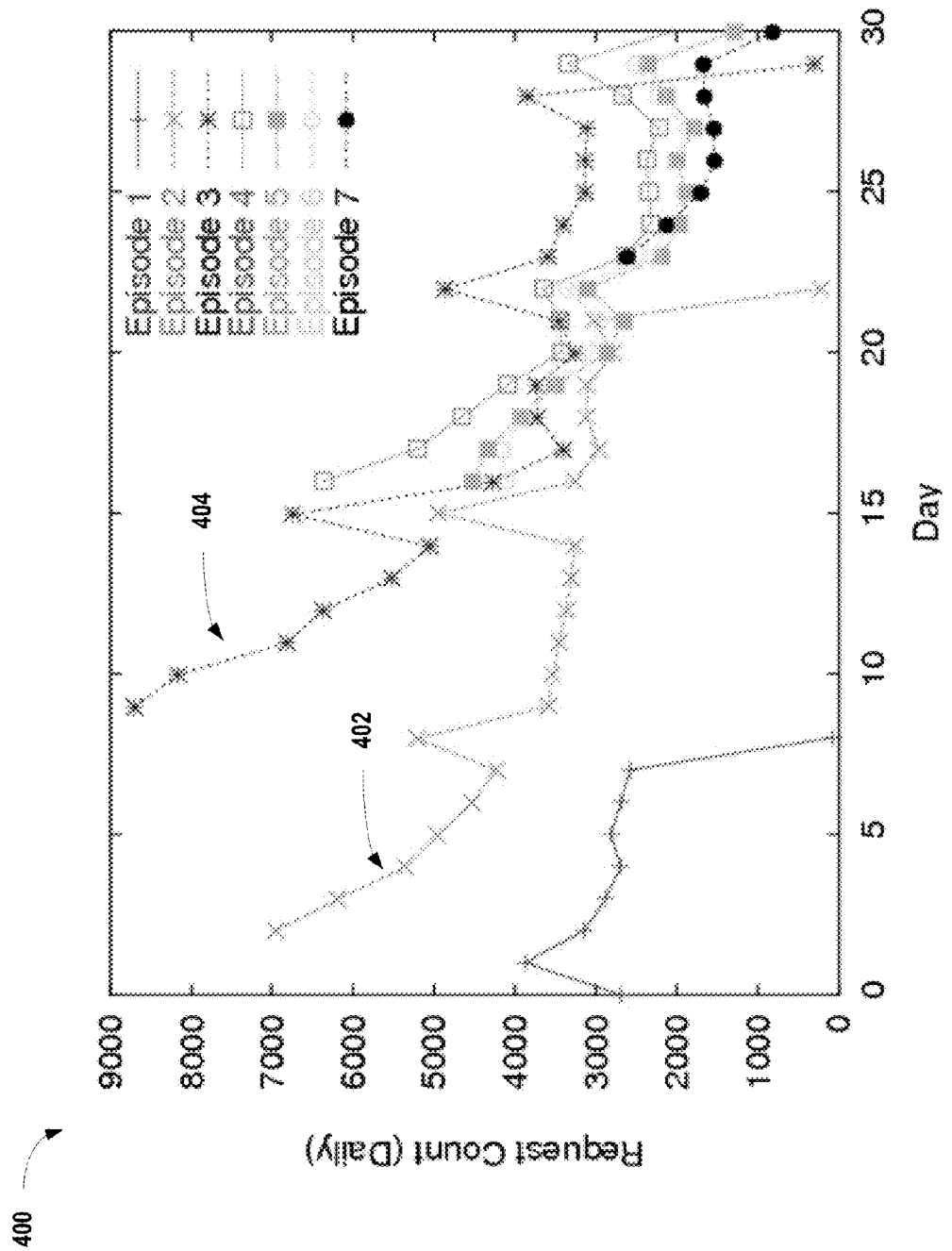
FIG. 4 is a graph illustrating sample data related to a daily request count for different episodes of a series show.

Referring to FIG. 4, illustrative sample data associated with the daily request count for different episodes of a series is illustrated and is designated 400. In FIG. 4, the daily request count for different episodes of a particular series shown during one month is presented. Although there is some variation, there is considerable similarity in the request volume for each episode of the series. For instance, on the day of release, a second episode 402 of a series was requested around 7000 times, and a third episode 404 of the series was requested around 8700 times. In the present system, a demand estimate for a new episode of a TV series may be based on the requests for the previous week's episode of the same series (e.g., the request pattern of the second episode 402 is used as the demand estimate for the third episode 404).

Another simple estimation strategy may be used for blockbuster movies. From exogenous information, there may be a list of blockbuster movies (e.g., 1-3 movies each week). Then, the demand history of the most popular movie in the previous week may be used as the predicted demand for the blockbuster movies that are released this week.

While TV shows and blockbuster movies account for the majority of requests for new videos—series episodes typically account for more than half of the requests for new releases—there may not be a demand estimate that is available for the remaining new videos (e.g., music videos, unpopular movies, etc.). The current system may use a small LRU or LFU cache (e.g., a complementary cache) to handle load due to new releases that do not have estimates. This cache also handles unpredictable popularity surges to some videos (which is often why LRU caches are used).

Time-Varying Demand

The request pattern may change significantly over time, both in aggregate intensity and its distribution over the individual items in the library. For instance, users typically make significantly more requests on Fridays and Saturdays, while the traffic mix during the peak intervals on those two weekend days are quite different. The bandwidth required to serve these requests may correspondingly vary when they are served from remote VHOs. It is desirable for the placement to be able to handle such change while still satisfying the link constraints throughout the entire time period that the placement would remain before it is re-evaluated.

While accounting for link utilization at all times (e.g., each second during a 7-day interval) might guarantee that the link constraint is not exceeded, it makes the problem computationally infeasible as the number of link bandwidth constraints (6) is proportional to |T|, the number of time slices in the time interval T. Therefore, a small number of peak demand periods may be identified (e.g., |T|=2) for which to enforce the link constraints. Experimental evaluation indicates that for a judicious choice of these peak time windows, enforcing the bandwidth constraints (6) in the MIP model only on these peak windows and using the resulting placement and service design is sufficient to prevent the demand during non-peak periods from overloading any links. If a small time window is selected to compute load, the representative load may not be captured and hence videos may not be placed appropriately. Using a large window to compute load may considerably over-provision capacity for the MIP to become feasible. This consideration may be examined by experimenting with several window sizes, as described below.

Placement Update Frequency

Another consideration is the frequency of implementing a new placement using the present algorithm. While updating the placement more frequently allows the system to adapt to changing demands and correct for estimation errors more gracefully, each update incurs overhead, both in computing the new MIP solution and migrating the content. The trade-off between more and less frequent updates is evaluated below.

Experimental Results

The performance of a particular scheme can be evaluated and various "what-if" scenarios can be studied through detailed simulation experiments. The particular scheme can be compared against existing alternatives of using an LRU or an LFU cache replacement strategy.

Experiment Setup

The experiments used a custom built simulator. By default, a 55-node network is used that is modeled from a backbone network of a deployed IPTV service. The network has 70+ bi-directional links connecting these locations. It may be assumed that all these links have equal capacity; however, the actual value is varied to understand the trade-off between disk capacity and link bandwidth. Similarly, there is a focus on the scenario where all VHOs have equal disk space, but results where VHOs have heterogeneous disk capacities are also presented. To simulate user requests, one month's worth of VoD request traces from a nationally deployed VoD service is used. This trace contains requests for various types of videos, including music videos and trailers, TV shows, and full-length movies. For simplicity, these videos can be mapped to four different video lengths: 5 minutes, 30 minutes, 1 hour, and 2 hours and it may be assumed that there is a need for 100 MB, 500 MB, 1 GB, and 2 GB respectively for storing them on disk. It may be assumed that all videos are of standard definition and stream at 2 Mbps. Analysis may begin with a baseline scenario of a backbone network with each link being 1 Gbps and the aggregate disk capacity across all VHOs being 2 times the entire library size. Multiple parameters may then be varied in order to understand the various trade-offs and sensitivity of the system.

In the experiments, the MIP formulation is used to place the videos in the VHOs. Unless stated otherwise, the MIP-based placement is updated every week using the video requests in the previous 7 days as history. Time windows of 1 hour each across two time slices to capture the link constraints may be assumed. For comparison, three alternative approaches are simulated:

Random+LRU: For each video, one copy is placed at a randomly chosen VHO. The rest of disk space in each VHO is used for LRU cache.

Random+LFU: This is similar to Random+LRU, but uses LFU instead of LRU.

Top-K+LRU: Top K videos are replicated at every VHO. The remaining videos are assigned randomly to one location. The remaining disk space at each location is used for LRU cache.

Due to the local cache replacement in all the alternative approaches, if a VHO does not have a local copy of a requested video, it may be difficult in practice for the VHO to find which VHO is best to fetch the video from. In the experiments, it is assumed that there is a database that can identify the nearest location with a copy of the video, which is the best case for caches in terms of minimizing the total bandwidth consumed for the transfer.

Performance of the MIP Scheme

In the first experiment, a MIP instance is solved and the videos are placed according to that solution. Then, the request log is played out based on the solution. For each week, a new parameter set is constructed based on the previous week's demand history and a new MIP instance is computed. A link capacity of 1 Gbps is used for MIP constraints. The aggregate disk space is approximately 2 times the entire library size. Of this, around 5% of the disk space at each VHO is used as an LRU cache. The present scheme is compared with the three alternatives using the same disk space. For the top-K, experiments included both K=10, and K=100. Results are presented only for K=100, as K=10 was highly similar to Random+LRU. The first nine days' requests are used to warm up the caches and run the tests using the remaining three weeks of requests.

Maximum Link Bandwidth

Figure 5:
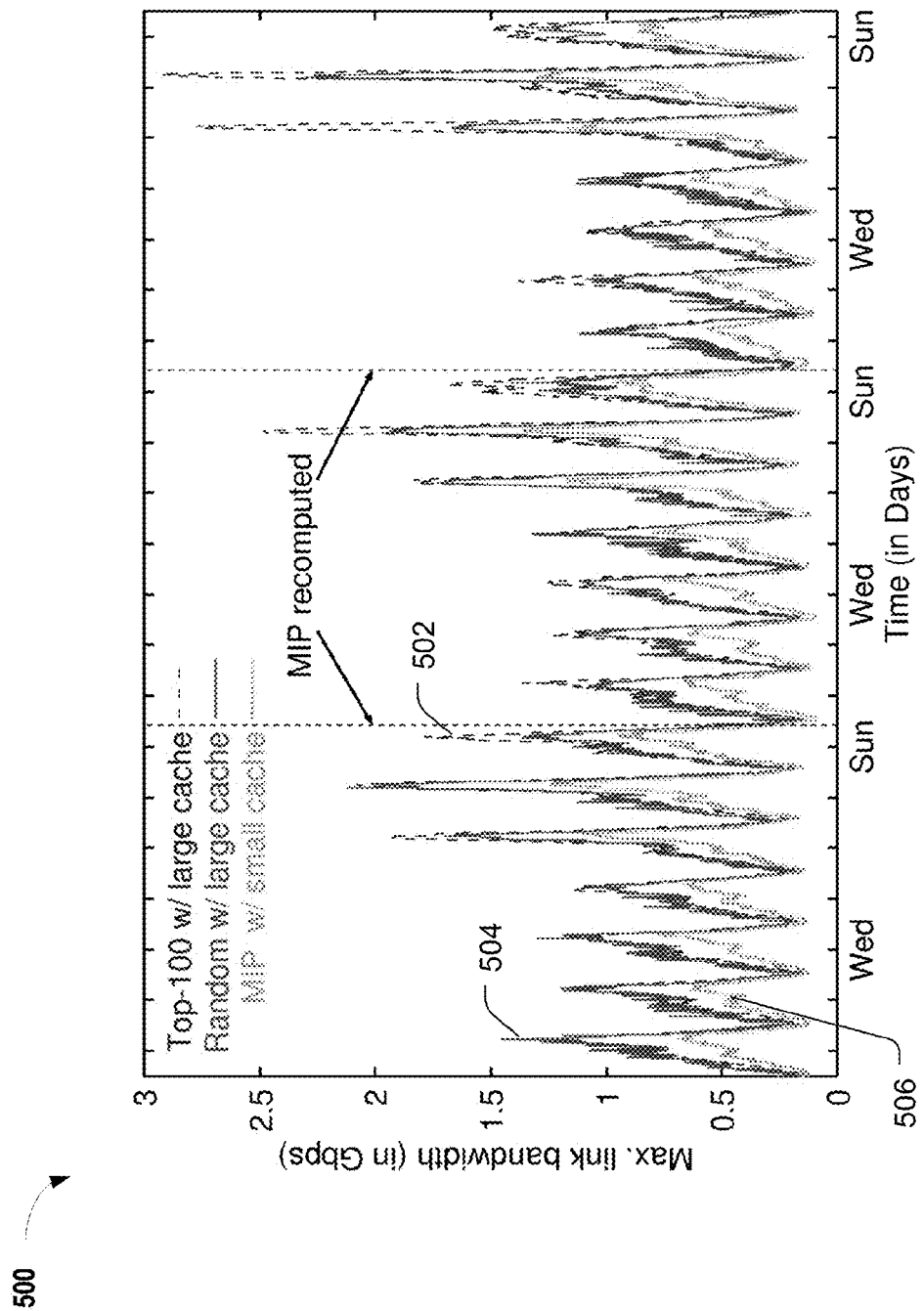
FIG. 5 is a graph illustrating sample data related to peak line bandwidth utilization.

Referring to FIG. 5, illustrative sample data associated with peak bandwidth utilization is illustrated and is designated 500. FIG. 5 identifies the maximum link usage across all links at each time and shows how it varies over the three-week period (for Top-100 with large cache 502, random with large cache 504, and MIP with small cache 506). For the same amount of disk space, the proposed scheme can satisfy all requests using significantly lower peak bandwidth. Specifically, the maximum bandwidth needed for the proposed case is 1364 Mbps, while the maximum value for Random+LRU is 2400 Mbps, 2366 Mbps for Random+LFU, and 2938 Mbps for Top-100+LRU. Note that the maximum value for the proposed scheme is slightly larger than 1 Gbps, which is the link capacity provided for the MIP instance. This is because each week introduces new videos, some of which may not have a good estimate. While the small LRU cache helps absorb some of the errors in estimation, a more sophisticated estimation strategy may help even further. This was confirmed through experiments assuming perfect knowledge of traffic pattern: the maximum bandwidth in that case always stayed within the constraint of 1 Gbps (See below).

Total Bytes Transferred

Figure 6:
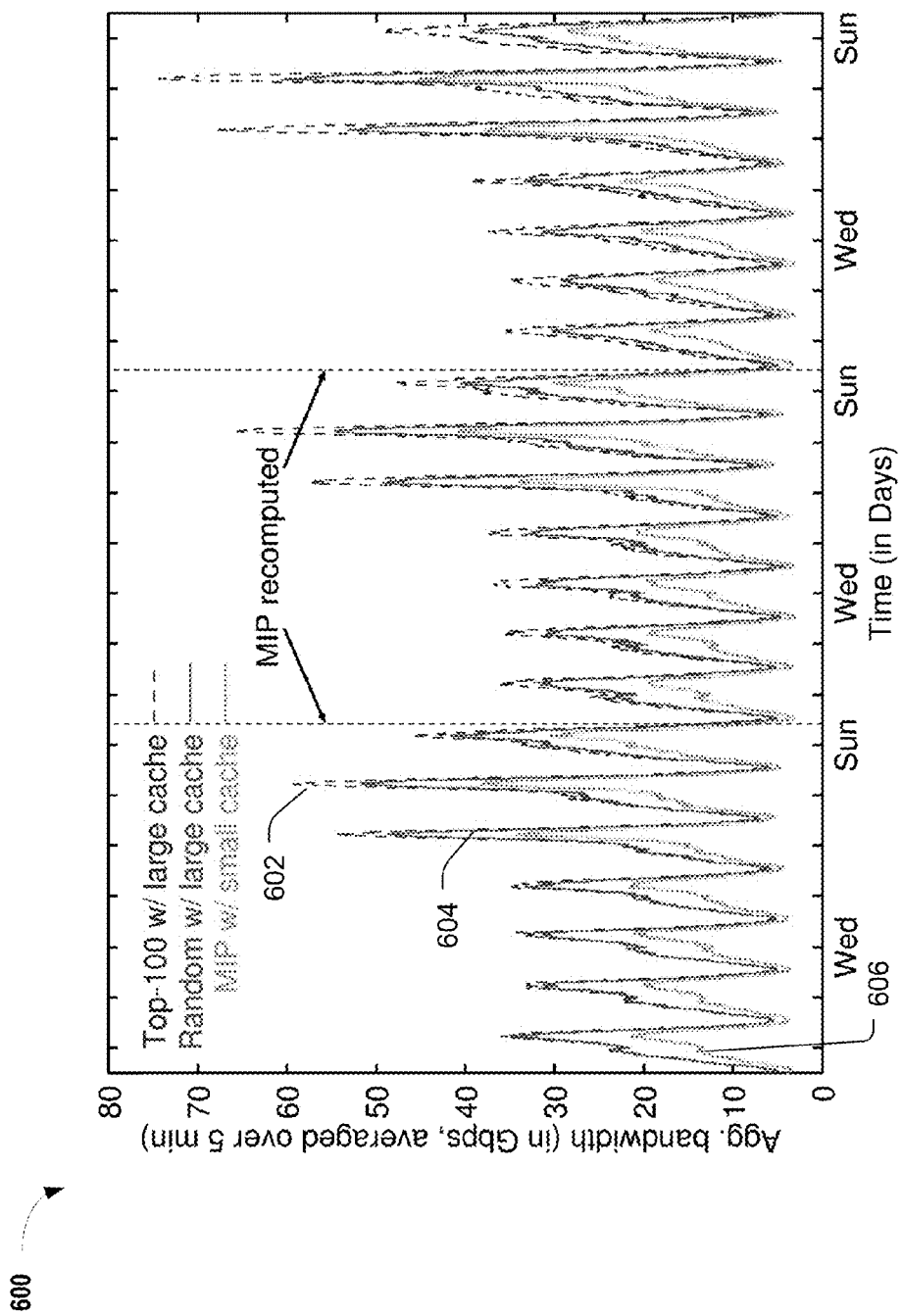
FIG. 6 is a graph illustrating sample data related to aggregate bandwidth across all links.

The total amount of network transfer is calculated, where each video transfer is weighted by the video size and hop count. A good placement scheme will result in a small value because most of the requests would be satisfied locally or by nearby neighbors. Referring to FIG. 6, illustrative sample data associated with the results is illustrated and is designated 600. The aggregate transfers across all links and the average over five minute intervals are calculated (for Top-100 with large cache 602, random with large cache 604, and MIP with small cache 606). Similar trends may be observed as were observed for the peak bandwidth (See FIG. 5). The proposed scheme consistently transfers fewer bytes compared to the other caching based schemes. LRU and LFU perform almost identically. Surprisingly, Top-100+LRU results in a higher peak utilization and total bytes transferred. This may be attributed to the fact that video popularity does not have a very high skew; even the less popular videos incur significant load. With the Top-100 videos occupying significant storage, there is less space for the LRU cache, and hence the performance becomes worse.

Figure 7:
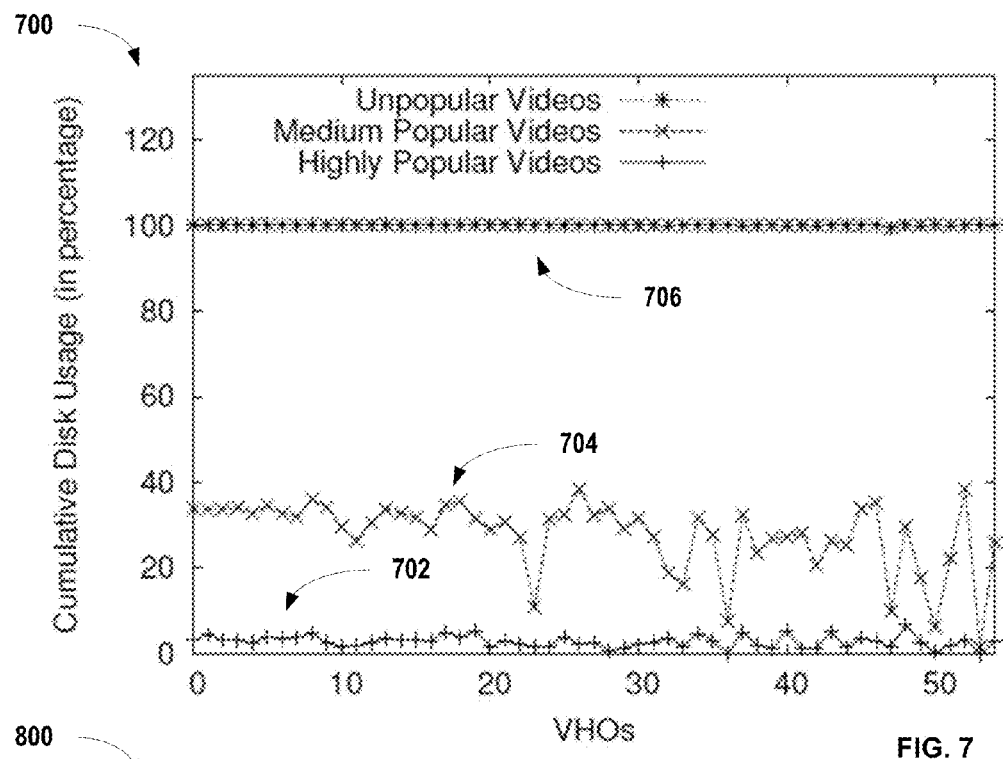
FIG. 7 is a graph illustrating sample data related to disk usage based on video popularity.
Figure 8:
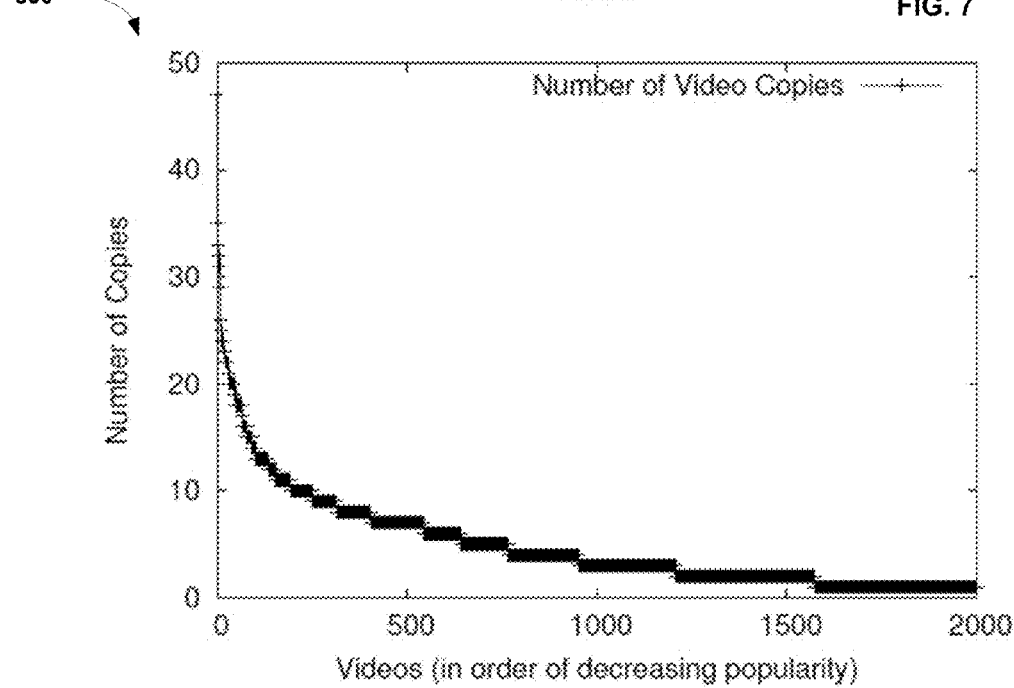
FIG. 8 is a graph illustrating sample data related to a number of copies of each video, ranked by demand.

To analyze this further, the break-up of disk utilization in each VHO based on one solution to the present MIP formulation is presented in FIG. 7. Referring to FIG. 7, illustrative sample data associated with disk usage based on video popularity is illustrated and is designated 700. The top 100 videos may be characterized as highly popular 702, the next 20% of videos as medium popular 704, and the remaining as unpopular 706. The highly popular videos 702 occupy a relatively small portion of the total disk space, while the medium popular videos 704 occupy a significant proportion of the total disk space in the system (e.g., more than 30%). The number of copies for each of the top 2000 videos in one of the MIP solutions is also presented (FIG. 8). Referring to FIG. 8, sample data associated with a number of copies of each video (ranked by demand) is illustrated and is designated 800. As illustrated, the present solution intelligently places more copies for popular videos. This is to avoid remotely fetching frequently requested videos, which not only increases the overall cost (i.e., byte transfer), but also leads to link capacity violations. However, in the present solution, even highly popular videos are not replicated everywhere (e.g., less than 30 VHOs have a copy of the 10th most popular video). On the other hand, more than 1500 videos have multiple copies in the entire system. FIGS. 7 and 8 indicate that medium popular videos 704 result in significant load and are to be dealt with intelligently. A given movie may need only a few copies—anywhere from 2 copies to 10 copies—but together these videos consume significant space. As a result, the present solution carefully distributes copies of these videos across the VHOs. Unfortunately, caching schemes may have difficulty dealing with medium popular videos 704, unless the cache size is sufficiently large.

Comparative LRU Cache Performance

Figure 9:
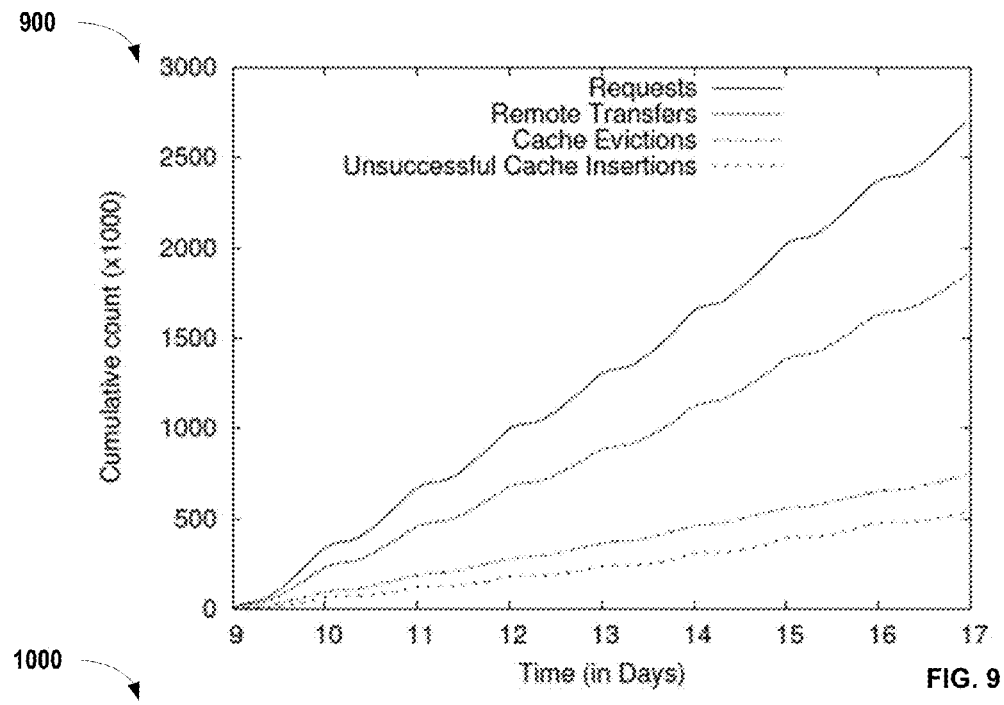
FIG. 9 is a graph illustrating sample data related to performance of least recently used (LRU) caches.

A simple experiment was performed in order to understand the performance of a dynamic LRU cache replacement strategy. The aggregate disk space across all locations is approximately twice the entire library size, while each location has the same disk space (and equal to the disk used in the MIP experiments). More than half of the space in each VHO was reserved for the LRU cache. The results are presented in FIG. 9. Referring to FIG. 9, illustrative sample data associated with performance of LRU caches is illustrated and is designated 900. As illustrated in FIG. 9, not only does the cache cycle, but a large number of videos are not cachable because all the space in the cache is currently being used. As a result, almost 20% of the requests could not be cached locally, with around 60% of requests being served by remote offices.

Other Results

The experiments were repeated with the aggregate disk space being 5 times the library size. The results indicate that the present approach still results in lower aggregate and peak bandwidth, although the difference between the present scheme and the other approaches is smaller. Another experiment included the case of infinite link bandwidth to compare with the unconstrained link case. Then, the maximum link bandwidth used by such a solution sometimes grows to more than twice the link bandwidth used by embodiments disclosed herein. In general, since a solution to the unconstrained problem does not have a limit on link usage, the maximum link usage can grow arbitrarily large, while the present scheme may find the best trade-off, given the link and disk constraints.

Trade-Off Between Storage and Bandwidth

Figure 10:
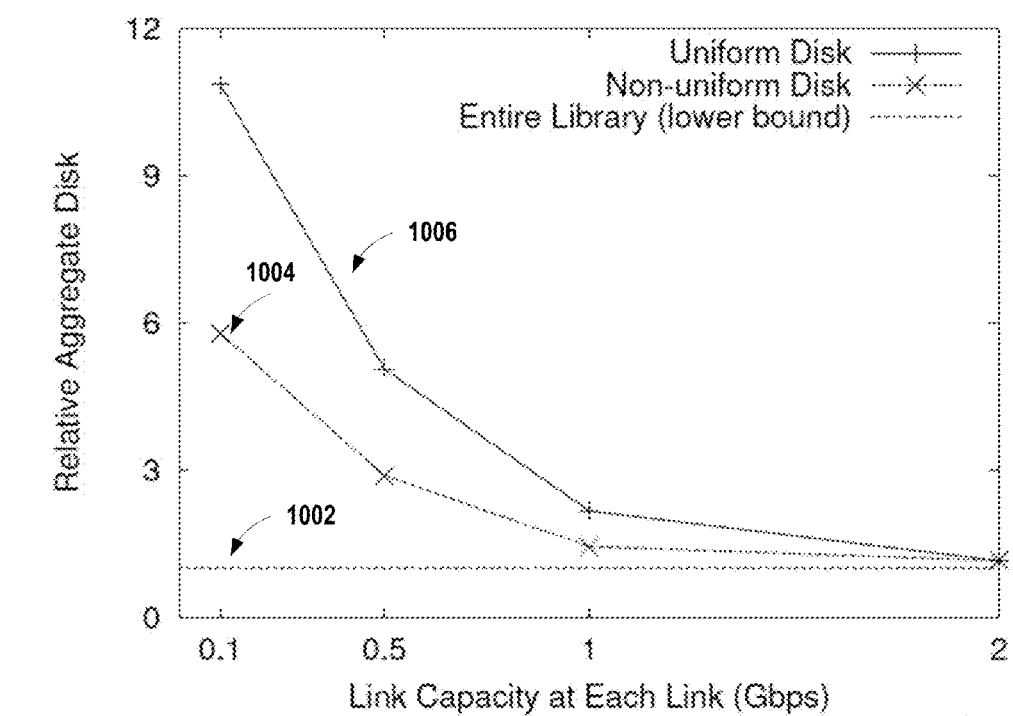
FIG. 10 is a graph illustrating sample data related to a feasibility region.

To understand the trade-off between storage and bandwidth, the present approach identifies how much disk space is needed to find a feasible solution to the MIP, given the link capacity. FIG. 10 shows the feasibility region (where all the requests can be served without violating disk and link constraints) when the link capacity is varied. Referring to FIG. 10, illustrative sample data associated with a feasibility region is illustrated and is designated 1000. Note that the minimum aggregate disk space in the system is as large as the entire library size 1002, to store at least one copy of each movie (the bottom line in FIG. 10). When each link has a capacity of 0.5 Gbps, and all VHOs have the same amount of disk (denoted by "Uniform Disk"), at least 5 times more disk is used than what is used to store one copy of each movie. It may also be observed that if link capacity is increased, then all the requests can be satisfied with much smaller disk.

A case where there are three different types of VHOs is also considered. Based on the number of subscribers at individual VHOs, 12 large VHOs, 19 medium VHOs, and 24 small VHOs can be identified. In the present experiments, a large VHO has twice the disk of a medium VHO, which in turn has twice the disk of a small VHO. The middle line 1004 in FIG. 10 corresponds to the case of non-uniform VHOs. It can be observed that, compared to the uniform VHO case 1006, significantly smaller aggregate disk space can satisfy all the requests. Specifically, with 0.5 Gbps links, the total disk size is less than 3 times the entire library size (vs. 5 for the uniform VHO case). This is because the majority of requests originate from those large VHOs and some of the medium VHOs. With a larger disk, these VHOs can serve more videos locally. As the link capacity is increased, the gap between uniform and non-uniform cases decreases and converges to the library size.

Scalability

Figure 11:
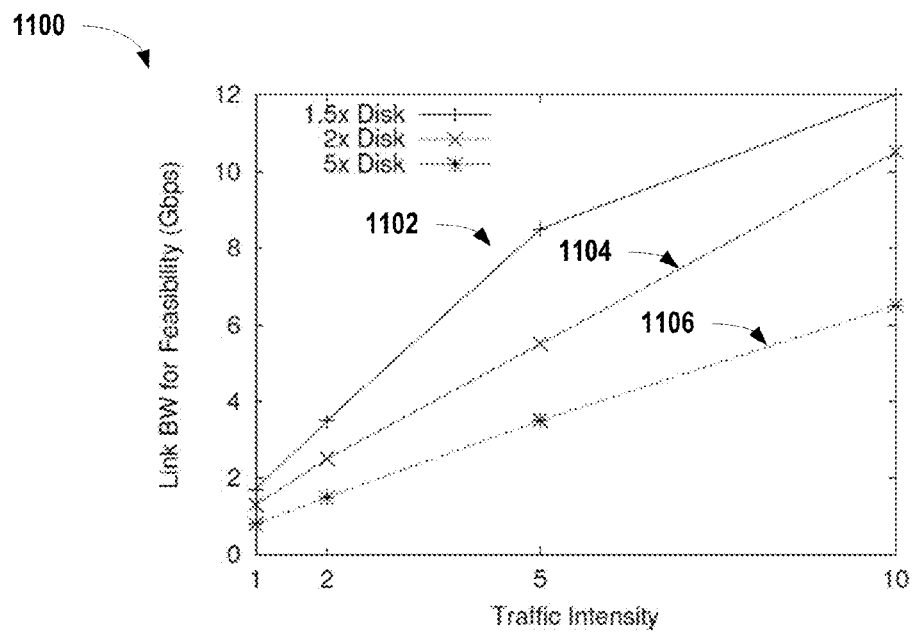
FIG. 11 is a graph illustrating sample data related to an effect of request intensity.

In the next set of experiments, the library size and request load are varied in order to investigate how the system resource requirement varies accordingly. In the first experiment, the library size is fixed and the number of requests is increased, while maintaining the same popularity distribution as the trace, which can be approximated by a combination of zipf with an exponential drop-off. The diurnal patterns are also maintained as the request intensity is scaled. FIG. 11 plots the minimum capacity for each link to serve all requests without violating constraints. Referring to FIG. 11, illustrative sample data associated with the effect of request intensity is illustrated and is designated 1100. Three cases are illustrated, with different disk capacities at each VHO. For example, a first case 1102 represents 1.5× disk capacity, a second case 1104 represents 2× disk capacity, and a third case 1106 represents 5× disk capacity. Larger link capacity is utilized with smaller disk or more requests (e.g., larger user base). However, the growth rate for link capacity is slightly smaller than the growth rate of traffic intensity. This is because a local copy of a highly popular video is able to handle many requests without using the network.

Figure 12:
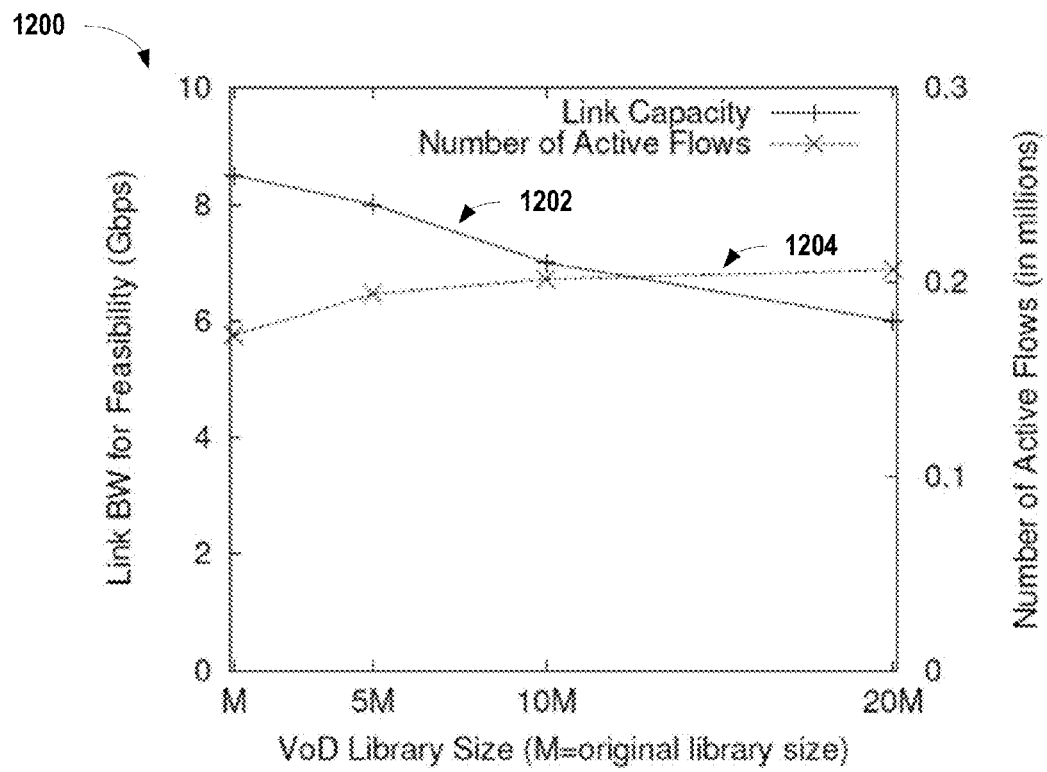
FIG. 12 is a graph illustrating sample data related to an effect of library growth.

The next experiment relates to growth in the VoD library. Based on log data determined in other experiments, the skew parameter remains similar even for the larger libraries (e.g., 250K videos). The process of trace generation was simplified by only sampling from a zipf distribution rather than a combination of zipf and exponential drop-off. The disk size at each VHO was set such that the aggregate disk space is around 3 times the library size. For ease of comparison, the same total number of requests is used regardless of the library size. The results are presented in FIG. 12. Referring to FIG. 12, illustrative sample data associated with the effect of library growth is illustrated and is designated 1200. In FIG. 12, two interesting trends may be observed. First, the link bandwidth 1202 for a feasible solution (with 3× disk) drops as the library size increases. This is due to the combination of increased disk space and distribution of requests to videos. Second, the number of active flows 1204 in the peak (i.e., total number of requests for videos) increases with library size. This is because as the number of videos increases, for the same total number of requests, the distribution of requests is more dispersed.

Complementary Caching

Figure 13:
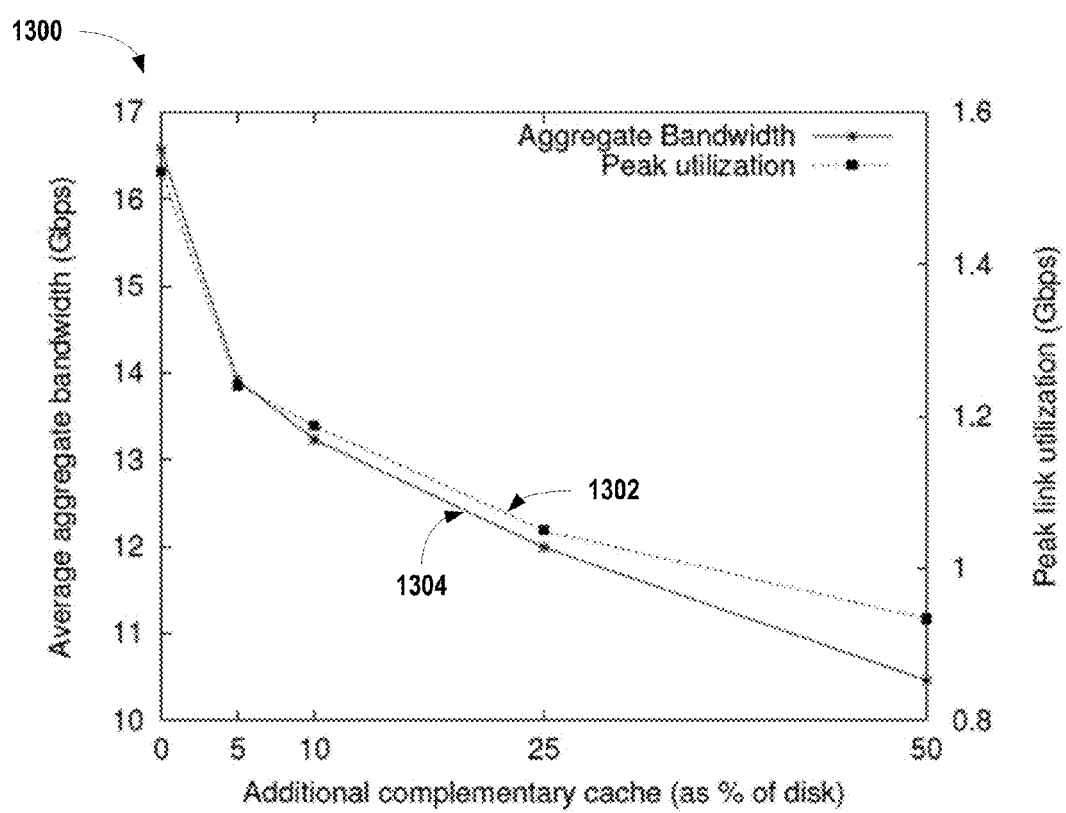
FIG. 13 is a graph illustrating sample data related to complementary caches.

In this experiment, the effect of complementary caching on the performance of the MIP solution is examined. The amount of cache is varied as a percentage of the disk space at each VHO and that space is added to each VHO. The experiment uses one week's worth of requests and measures the peak link utilization and the average aggregate bytes transferred. The results are shown in FIG. 13. Referring to FIG. 13, illustrative sample data associated with the importance of complementary caches is illustrated and is designated 1300. As expected, both peak utilization 1302 and aggregate bandwidth 1304 decrease with increasing cache size. The reduction is significant from no cache to 5% cache. The reduction, however, is not as significant as the amount of cache is further increased. This result shows that while a cache is important to handle errors in estimation or sudden changes in popularity, correct placement is more important.

Topology

Different topologies may affect the capacity required to meet all requests. In addition to the backbone network used in the previous sections, two hypothetical networks are considered: tree and full mesh (where each pair of nodes has a direct link). An artificial topology generated by combining Sprint and Abovenet topologies from the RocketFuel traces is also considered. In each experiment, the same amount of aggregate disk is used across all VHOs, set at 3× the library size. Table 2 presents the experimental results. With more links, all requests can be served with lower link capacity. For instance, 1 Gbps capacity for each link is more than sufficient in the backbone case, while more than 2 Gbps is used for the tree topology.

TABLE 2

Topology vs. link capacity

| Topology | # Nodes | # Links | Feasibility Constraint (Gbps) |
|---|---|---|---|
| Backbone | 55 | 76 | 0.8 |
| Tree | 55 | 54 | 2.3 |
| Full Mesh | 55 | 1485 | 0.05 |
| RocketFuel | 40 | 74 | 0.8 |

Time-Varying Request Pattern

As previously discussed, there are only a small number of time windows over which the peak demand of videos requested is evaluated to determine if the placement ensures remaining within the link capacity constraints throughout the week. Experiments were performed in order to understand the trade-offs on choosing the time window by varying it from 1 second to 1 day. Results are shown in Table 3.

TABLE 3

Peak window size vs. bandwidth

| | Link Bandwidth (in Gbps) | | |
|---|---|---|---|
| Window Size | Feasibility Constraint | Max during LP window | Max during entire period |
| 1 second | 0.5 | 0.5 | 0.85 |
| 1 minute | 0.5 | 0.49 | 0.88 |
| 1 hour | 1.0 | 0.68 | 0.80 |
| 1 day | 2.0 | 0.94 | 0.96 |

Using the peak request demand for 1-second time windows, a feasible solution may exist for the MIP when each link is 0.5 Gbps. It may also be observed that the maximum link utilization during the corresponding time window is 0.5 Gbps. However, outside the peak window, some of the links are loaded up to 0.85 Gbps. This is because the MIP solution considers the link constraints only during the 1-second window, and due to a highly varying request mix, the request pattern during the window is not representative. As a result, the placement solution is not able to satisfy the link constraint outside of the window. Similar conclusions apply for 1-minute windows. On the other hand, with 1-day time windows, a feasible solution requires 2 Gbps links. But it may be observed that all links carry less than 1 Gbps of traffic during the entire 7-day period. Thus, 1-day windows lead to a significant over-estimation of the required link bandwidth. With 1-hour windows, the feasible solution requires 1 Gbps links. Correspondingly, the maximum link bandwidth over the entire 7-day period is also less than 1 Gbps. Thus, 1-hour windows may provide the best trade-off between accurate estimation of the peak window and actual link utilization.

Frequency of Placement Update and Estimation Accuracy

Running the placement often may allow for handling demand changes or estimation errors gracefully. However, each iteration incurs computational and transfer overheads. Different placement frequencies were examined in order to determine the effect on performance Table 4 shows the maximum link bandwidth usage, total data transfer, and the fraction of requests served locally for two weeks. Both video size and number of hops are considered to calculate total data transfer, as in (2). The complementary LRU-cache is not used here. If the placement is updated once in two weeks, then the maximum bandwidth grows significantly. This is because with less frequent updates, the error in demand estimation accumulates over time, as the current placement does not adapt to changes in the demand pattern. Compared to weekly updates, daily updates only modestly improve the maximum bandwidth usage or miss ratio. However, by utilizing the most recent request history information, around 10% improvement in terms of total data transfer may be achieved. Using a 14-day history with weekly placement updates, no meaningful differences were observed compared to a 7-day history.

Table 4 quantifies the error in the estimation of demand for new videos by presenting the performance with perfect knowledge. With perfect knowledge, the present MIP-based solution always maintains the link utilization below capacity (1 Gbps), serves all the requests while using less total network bandwidth, and serves a majority of requests locally. On the other hand, without any estimation for new videos, the maximum bandwidth grows to over 8+ times the link capacity, and the resulting placement results in multiple remote transfers. The present estimation strategy, while not perfect, allows for performance comparable to when perfect knowledge is available.

TABLE 4

Impact of update frequency on the placement performance

| | Max BW (in Gbps) | Total Transfer (TB × hop) | Locally served |
|---|---|---|---|
| once in 2 weeks | 2.23 | 3284 | 0.545 |
| weekly | 1.32 | 2776 | 0.575 |
| daily | 1.30 | 2448 | 0.585 |

TABLE 4-continued

Impact of update frequency on the placement performance

| | Max BW (in Gbps) | Total Transfer (TB × hop) | Locally served |
|---|---|---|---|
| perfect estimate | 0.97 | 2052 | 0.606 |
| no estimate | 8.62 | 7042 | 0.144 |

Cost of Placement Updates:

One aspect to consider when determining the frequency of updates is the network transfer cost due to video migration for a new placement. Equation (9) may be slightly modified, such that the cost of migration based on the previous mapping is considered. In experiments with this modified objective term, around 2.5K videos need to be transferred between two placements. This may be considered a small cost compared to the number of requests (e.g., 100 Ks per day) and hence may be considered quite manageable. In practice, the update costs may be lowered by piggybacking on requests. That is, when a new placement requires a particular VHO i to store video m, i can wait until a user requests m, fetch it and store a copy in the pinned portion of disk.

Thus, in order to meet the growing need for on-demand content, in the present disclosure the problem of placing video content across distributed offices of a VoD provider connected via a high-bandwidth backbone was considered. The present MIP formulation considers the constraints of disk space and link bandwidth to scalably find a near-optimal placement solution optimized for all the videos in the library, across all locations in an arbitrary network topology, and video demand pattern. For real-world applicability, a number of strategies are presented to address practical issues. For instance, the request history over a one-week period may be used to place content at the VHOs to serve requests over the next week.

Extensive experiments were performed using trace data from an operational nationwide VoD service. The proposed scheme significantly outperforms existing schemes, including LRU and LFU-based caching schemes. The performance trade-offs and sensitivity were also investigated when disk space, link bandwidth, request volume, and library size were varied. The present replication strategy scales with the growth of VoD service and the orders of magnitude speed-up due to the present solution approach makes it suitable for practical deployment.

Figure 14:
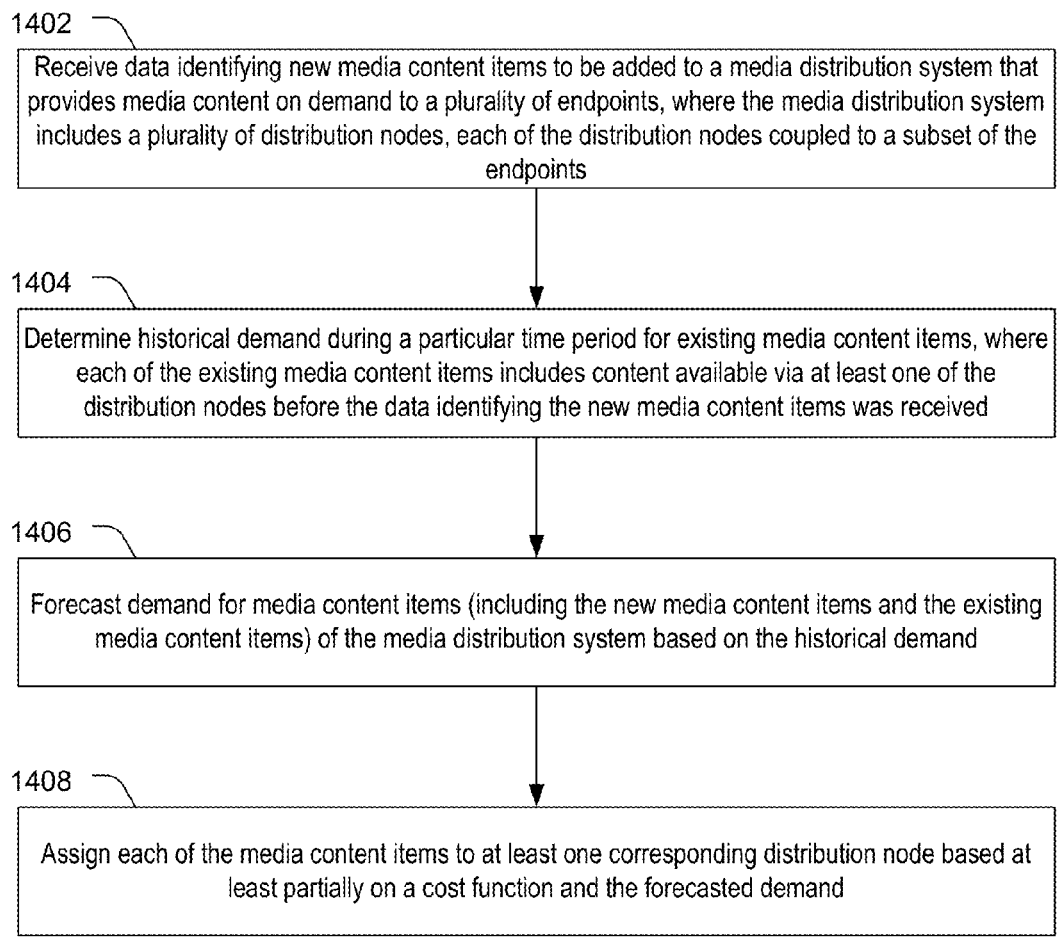
FIG. 14 is a flow chart of a first particular embodiment of a method of content placement.

FIG. 14 is a flow chart of a first particular embodiment of a method of placing media content in a media distributing system. The method includes, at 1402, receiving data identifying new media content items to be added to the media distribution system. The media content distribution system may include a system or network that provides media content on demand to a plurality of endpoints. For example, the media distribution system may include a plurality of distribution nodes, where each of the distribution nodes coupled to a subset of the endpoints. To illustrate, the distribution nodes may include video on demand servers. The new media content items may include video on demand content that is to be made available to the endpoints via the media distribution system. For example, the new media content items may include movies, television programs, movie previews, music videos, short films, or other media content that is to be added to a library of content that can be accessed via the media distribution system.

The method may also include, at 1404, determining historical demand for existing media content items during a particular time period. Existing media content items refers to media content items that are stored by the media distribution system that are not new media content items (e.g., items that are already in the library of content that is available via the media distribution system). For example, the existing media content items may include content that was available via at least one of the distribution nodes before the data identifying the new media content items was received. The historical demand may include a number of requests that were received during the particular time period to access each of the existing media content items.

The method may further include, at 1406, forecasting demand for media content items (including the new media content items and the existing media content items) of the media distribution system based on the historical demand. The forecasted demand may include an estimate or best guess based on the historical demand of how many requests will be received for each of the media content items during an upcoming or future time period. A particular illustrative embodiment of a method of forecasting demand is described with reference to FIG. 16.

The method may also include, at 1408, assigning each of the media content items to at least one corresponding distribution node based at least partially on a cost function and the forecasted demand. For example, a set of simultaneous equations may be solved to attempt to reduce or minimize the cost function subject to constraints of the media distribution system (e.g., storage capacity of each distribution node, location and number of the distribution nodes, bandwidth capacity available for communications between the distribution nodes, etc.), subject to the forecasted demand, subject to customer service expectations (e.g., providing media content in a timely manner in response to each request), other constraints, or any combination thereof.

Figure 15:
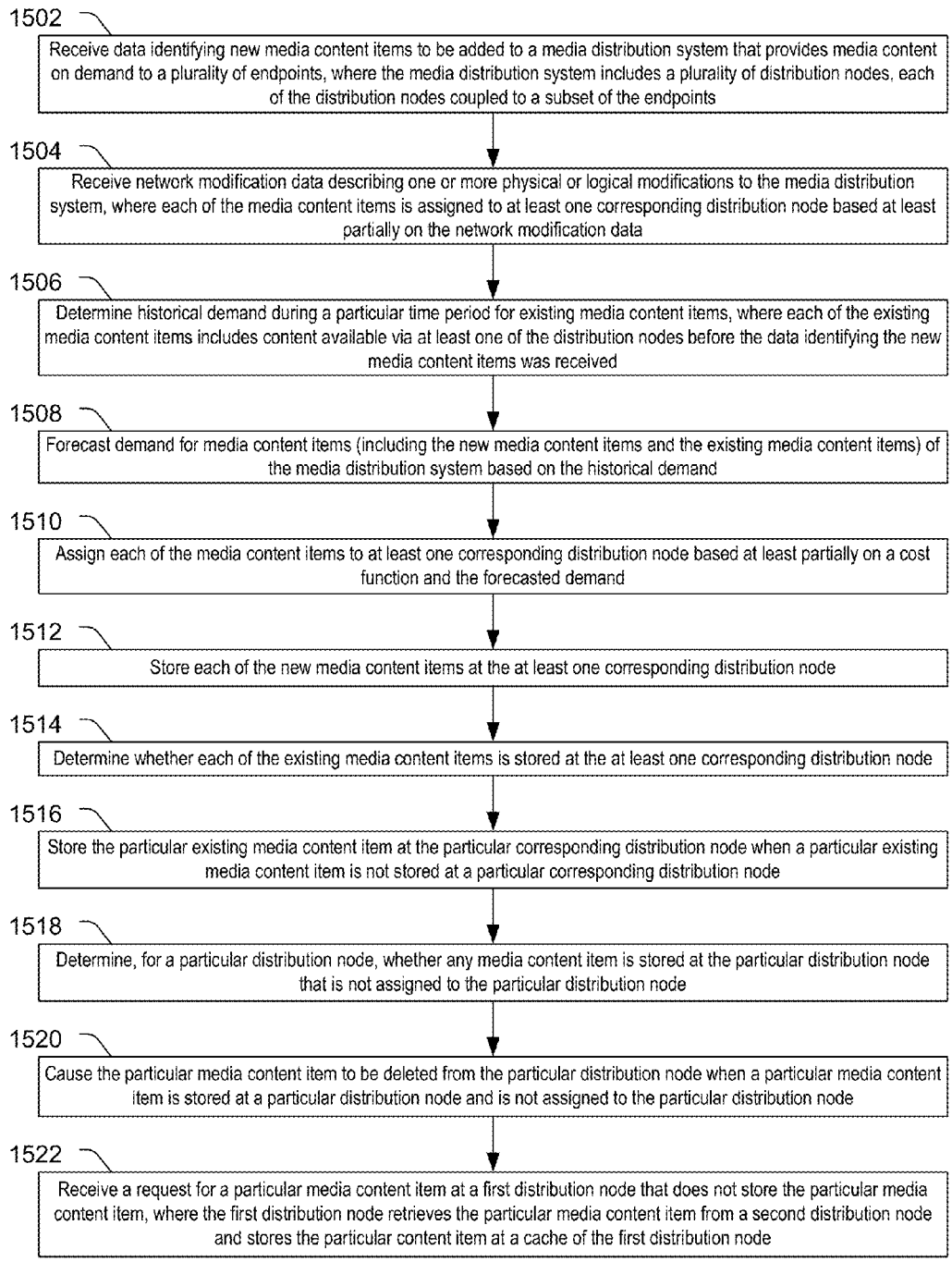
FIG. 15 is a flow chart of a second particular embodiment of a method of content placement.

FIG. 15 is a flow chart of a second particular embodiment of a method of placing media content in a media distributing system. The method may include, at 1502, receiving network modification data describing one or more physical or logical modifications to the media distribution system. The media content distribution system may include a system or network that provides media content on demand to a plurality of endpoints. For example, the media distribution system may include a plurality of distribution nodes, where each of the distribution nodes is coupled to a subset of the endpoints. In a particular embodiment, the media content items include video on demand content and the distribution nodes include video on demand servers. The network modification data may include information descriptive of changes that have been made to the media distribution system. For example, each of the distribution nodes may have a particular storage capacity for media content. The network modification data may indicate a change in the storage capacity of one or more of the distribution nodes. In another example, the media distribution system may include communication channels, such as backbone infrastructure (e.g., communication media such as wires, cables or fibers, and communication devices such as switches and routers), between the distribution nodes. The network modification data may indicates changes in the communication channels, such as a change in bandwidth capacity of a particular communication channel, a newly available or unavailable communication channel, a change in logical or physical topology of a network, other information descriptive of the media distribution systems current ability to communicate data, or any combination thereof. The network modification data may indicate addition or removal of a distribution node.

The method may include, at 1504, receiving data identifying new media content items to be added to the media distribution system. For example, the new media content items may include video on demand content that is to be made available to the endpoints via the media distribution system. To illustrate, the new media content items may include movies, television programs, movie previews, music videos, short films, or other media content that is to be added to a library of content that can be accessed via the media distribution system.

The method may include, at 1506, determining historical demand for existing media content items during a particular time period. Existing media content items refers to media content items that are stored by the media distribution system that are not new media content items (e.g., items that are already in the library of content that is available via the media distribution system). For example, the existing media content items may include content that was available via at least one of the distribution nodes before the data identifying the new media content items was received. The historical demand may include a number of requests that were received during the particular time period to access each of the existing media content items. The particular time period may be selected to correspond to a period at which new content is released for addition to the media distribution system. To illustrate, new movies and television programs may be released for distribution to video on demand providers approximately weekly; thus, the particular time period may be about one week. The particular time period may be selected based on another convenient period to add new content to the media distribution system, such as daily, monthly, yearly, or at an irregular interval, such as when a distribution license for a particular set of media content becomes available.

The method may include, at 1508, forecasting demand for media content items of the media distribution system based on the historical demand. The forecasted demand may include an estimate or best guess based on the historical demand of how many requests will be received for each of the media content items during an upcoming or future time period. A particular illustrative embodiment of a method of forecasting demand is described with reference to FIG. 16.

The demand may be forecasted based at least partially on a type of content associated with the at least one media content item. For example, the demand may be forecast for different types of media content independently. To illustrate, demand for television programs may be forecast separately from demand for movies, demand for movies may be forecast separately from demand for music videos, and so forth.

The method may include, at 1510, assigning each of the media content items to at least one corresponding distribution node based at least partially on a cost function and the forecasted demand.

For example, a set of simultaneous equations may be solved to attempt to reduce or minimize the cost function subject to constraints of the media distribution system (e.g., storage capacity of each distribution node, location and number of the distribution nodes, bandwidth capacity available for communications between the distribution nodes, etc.), subject to the forecasted demand, subject to customer service expectations (e.g., providing media content in a timely manner in response to each request), other constraints (e.g., an estimate of peak demand of the media distribution system), or any combination thereof. The media content items may be assigned to corresponding distribution nodes based on other factors as well, such as based at least partially on the network modification data. To illustrate, when a distribution node has added storage capacity, the added storage capacity may be considered when the media content items are assigned. In an illustrative embodiment, the media content items are assigned to the corresponding distribution node using a mixed integer program (MIP) model of the cost function. To illustrate, Lagrangian relaxation may be applied to the MIP model to facilitate assigning the media content items to the corresponding distribution nodes. The MIP model may be used to assign the media content items to the corresponding distribution nodes in a manner that approaches a minimum of the cost function subject to physical and logical constraints of the media distribution system and the forecasted demand.

The method may include, at 1512, storing each of the new media content items at the at least one corresponding distribution node. Thus, after the new media content items are assigned to corresponding distribution nodes, the new media content items may be stored at the corresponding distribution nodes and made available to endpoints. In a particular embodiment, the new media content item may be sent to the corresponding distribution node when a request is received at the corresponding distribution node for the new media content item. The method may also include, at 1514, determining whether each of the existing media content items is stored at the at least one corresponding distribution node. For example, the cost function may be reduced by having one or more of the existing content items available at a different distribution node or additional distribution node from where it is currently available. In this situation, the existing content item may be assigned to the different or additional node. The method may also include, at 1516, storing a particular existing media content item at a particular corresponding distribution node when the particular existing media content item is not stored at the particular corresponding distribution node.

In addition to making sure that each media content item is stored at least one corresponding distribution node, the method may also remove media content items from distribution nodes to which the media content items are not assigned. To illustrate, a particular media content item may be stored at a first node (e.g., as a result of a previous media content placement assignment). When the new media content items are received, the media content placement method may determine that the particular media content item should no longer be assigned to the first node. Accordingly, the particular content item may be removed from the first node. For example, the method may include, at 1518, determining, for a particular distribution node, whether any media content item is stored at the particular distribution node that is not assigned to the particular distribution node. The method may further include, at 1520, causing the particular media content item to be deleted from the particular distribution node when a particular media content item is stored at a particular distribution node and is not assigned to the particular distribution node. For example, a message may be sent to the distribution node to delete the particular media content item. In another example, the particular media content item may be marked for deletion and overwritten at a later time.

The media distribution system may be configured to provide any media content item that is stored at any distribution node to any endpoint. Since each endpoint is coupled to a particular distribution node and every available media content item may not be stored at the particular endpoint, there may be times when a particular distribution node receives a request from an endpoint for a particular media content item that is not stored at the particular distribution node. In this situation, the particular distribution node may access the particular media content item from another distribution node via the media distribution system and store the particular media content item at a local cache.

To illustrate, when a particular endpoint sends a request for a particular media content item to a first distribution node, the first distribution node may determine whether the particular media content item is stored at the first distribution node. When the particular media content item is not stored at the first distribution node, the first distribution node may send a request for the particular media content item to a second distribution node. The second distribution node may send a copy of the particular content item to the first distribution node via a communication channel of the media distribution system. The first distribution node may store the particular media content item at a local cache of the first distribution node, at 1522. The cache may include a storage area of the first distribution node from which media content items are occasionally removed. For example, the first distribution node may remove media content items from the local cache on a least recently used basis or on a least frequently used basis. In a particular embodiment, in contrast to the local cache, media content items are removed from storage at corresponding distribution nodes to which they are assigned only in response to a change in the assignment. That is, in this embodiment, media content items that are stored at corresponding distribution nodes in response to an assignment determined based on the cost function, e.g., at 1510 and 1512, continue to be stored at the corresponding distribution nodes until new assignments are determined, e.g., at a future time period.

Figure 16:
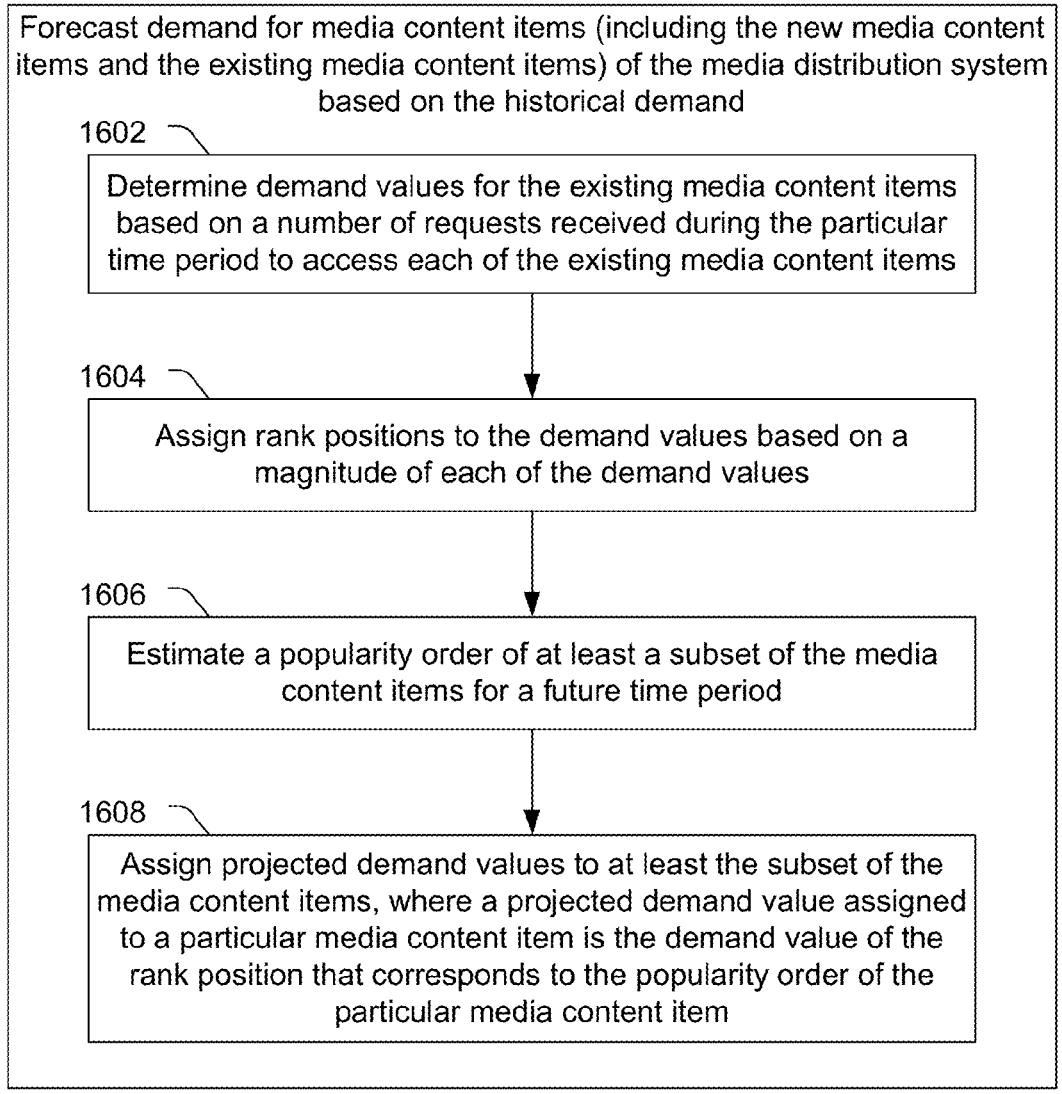
FIG. 16 is a flow chart of a second particular embodiment of a method of content placement.

FIG. 16 is a flowchart of a particular embodiment of a method of forecasting demand for media content items. The method may be used to forecast demand for media content items (including the new media content items and the existing media content items) of the media distribution system based on the historical demand. The method may include, at 1602, determining demand values for the existing media content items based on a number of requests received, during a particular time period, to access each of the existing media content items. For example, the particular time period may be one week, and the demand values may include a count for each request received during the week for each media content item that is available via the media distribution system.

The method may include, at 1604, assigning rank positions to the demand values based on a magnitude of each of the demand values. For example, the media content items may be sorted based on the demand values such that a most requested media content item is assigned to a first rank position, a second most requested media content item is assigned to a second rank position, and so forth. The demand value of each media content item may thus be associated with the rank position of the media content item. Alternately, only the demand values may be assigned to rank positions. That is, a first demand value corresponding to a largest number of requests received for a media content item during the particular time period may be assigned to a first rank position, a second demand value corresponding to a second largest number of requests received for a media content item during the particular time period may be assigned to a second rank position, and so forth.

The method may include, at 1606, estimating a popularity order of at least a subset of the media content items for a future time period. In a particular embodiment, the estimated popularity order is a relative estimate of popularity of at least a subset of the media content items. For example, the estimated popularity order may merely indicate that a first media content item is expected to be more popular than a second media content item. This relative estimate may be based on historical data, such as box office revenues associated with each media content item, ratings or reviews associated with each media content item, popularity of content related to the media content items (e.g., popularity of other programs in a series when the media content item is one program in a series, popularity of a genre associated with the media content items), and so forth. To illustrate, when the television program Seinfeld was in production, a new episode of Seinfeld that was released to a video on demand service provider may have been expected to be more popular than a new episode of certain other television programs based on the relatively high popularity of the television program Seinfeld. Additionally or in the alternative, the relative estimate may be based on marketing data, such as polling results, advertising revenue associated with each media content item, and so forth. To illustrate, a new blockbuster movie that is made available via a video on demand service and that has had a large advertising budget may be expected to be more popular than a made for television movie with a relatively small advertising budget. Additionally or in the alternative, the relative estimate may be based on timing. For example, seasonal media content items (such as movies associated with particular holidays) may be expected to be more popular during particular seasons than in other seasons. To illustrate, horror movies may be more popular during the month of October as Halloween approaches, but may be relatively less popular in December as Christmas and other holidays approach.

The method may include, at 1608, assigning projected demand values to at least the subset of the media content items. In a particular embodiment, a projected demand value assigned to a particular media content item is the demand value of the rank position that corresponds to the popularity order of the particular media content item. To illustrate, when 10,000 requests were received for the most popular movie during a previous week, the demand value 10,000 may be associated with the first rank position (i.e., rank position number 1). Thus, the projected demand value 10,000 may be assigned to an expected most popular movie during a subsequent time period (e.g., the next week) based on the popularity order. That is, the most popular movie in the estimate popularity order may be assigned the projected demand value 10,000.

In a particular embodiment, demand may be forecast separately for different types of media content items. For example, a video on demand system may distribute video content that includes movie previews, music videos, television programs, short films, full length movies, other types of media content items, or any combination thereof. Some of these different types of media content items may be distinguished based on viewing time. For example, a full length movies may have a viewing time that is longer than an hour; whereas, music videos may be significantly shorter (e.g., less than ten minutes). To further illustrate, the media content items include a first set of video content items that have a first viewing length (e.g., less than about ten minutes), a second set of video content items that have a second viewing length (e.g., between about ten minutes and about thirty minutes), a third set of video content items that have a third viewing length (e.g., between about thirty minutes and about one hour), and a fourth set of video content items that have a fourth viewing length (e.g., greater than about one hour). The demand for the first set of video content items, the second set of video content items, the third set of video content items, and the fourth set of video content items may be forecasted independently. Thus, demand for music videos with a viewing time of less than ten minutes may be forecasted independently of demand for television programs with a viewing time between thirty minutes and one hour. Additionally, historical demand data for a particular type of media content items may be used to forecast demand for that particular type of media content items. To illustrate, in the method of FIG. 16, demand values associated with music videos may be used to forecast demand for music video; whereas, demand values associated with movies may be used to forecast demand for movies.

Figure 17:
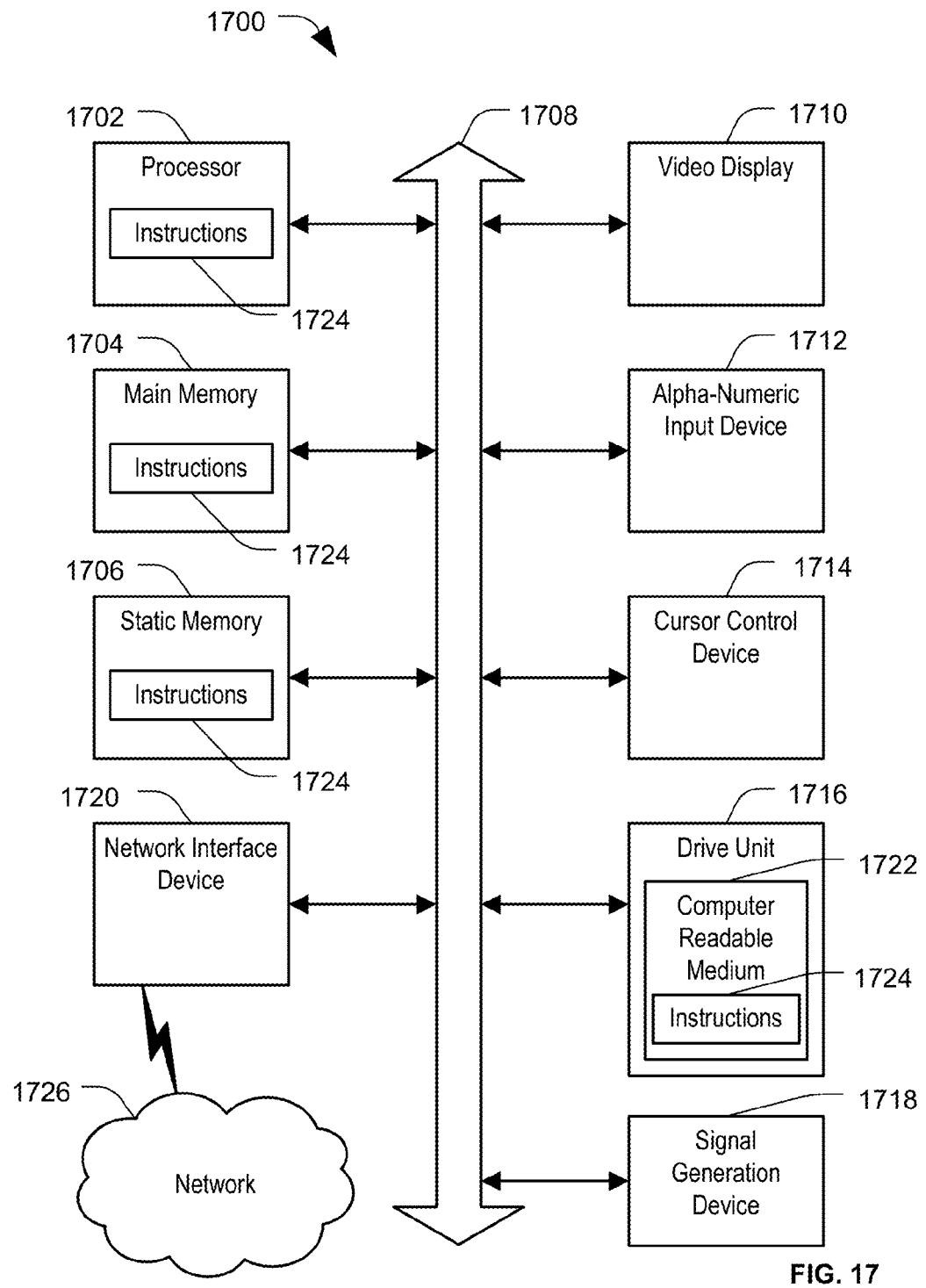
FIG. 17 is an illustration of an illustrative embodiment of a general computer system.

Referring to FIG. 17, an illustrative embodiment of a general computer system is shown and is designated 1700. The computer system 1700 can include a set of instructions that can be executed to cause the computer system 1700 to perform any one or more of the methods or computer based functions disclosed herein. The computer system 1700 may operate as a standalone device or may be connected, e.g., using a network, to other computer systems or peripheral devices. For example, the general computer system 1700 may include or be included within any one or more of the SHOs, VHOs, routers, metro intermediate offices, video serving offices, digital subscriber loop access multiplexers, residential gateways, set-top boxes of FIG. 1 or other computing systems that determine placement of content in the system 100 of FIG. 1.

In a networked deployment, the computer system 1700 may operate in the capacity of a server or as a client user computer in a server-client user network environment, or as a peer computer system in a peer-to-peer (or distributed) network environment. The computer system 1700 can also be implemented as or incorporated into various devices, such as a personal computer (PC), a tablet PC, a set-top box (STB), a personal digital assistant (PDA), a mobile device, a palmtop computer, a laptop computer, a desktop computer, a control system, a network router, switch or bridge, or any other machine capable of executing a set of instructions (sequential or otherwise) that specify actions to be taken by that machine. In a particular embodiment, the computer system 1700 can be implemented using electronic devices that provide voice, video or data communication. Further, while a single computer system 1700 is illustrated, the term "system" shall also be taken to include any collection of systems or sub-systems that individually or jointly execute a set, or multiple sets, of instructions to perform one or more computer functions.

As illustrated in FIG. 17, the computer system 1700 may include a processor 1702, e.g., a central processing unit (CPU), a graphics processing unit (GPU), or both. Moreover, the computer system 1700 can include a main memory 1704 and a static memory 1706 that can communicate with each other via a bus 1708. As shown, the computer system 1700 may further include a video display unit 1710, such as a liquid crystal display (LCD), an organic light emitting diode (OLED), a flat panel display, or a solid state display. Additionally, the computer system 1700 may include an input device 1712, such as a keyboard, and a cursor control device 1714, such as a mouse. The computer system 1700 can also include a disk drive unit 1716, a signal generation device 1718, such as a speaker or remote control, and a network interface device 1720.

In a particular embodiment, as depicted in FIG. 17, the disk drive unit 1716 may include a computer-readable medium 1722 in which one or more sets of instructions 1724, e.g. software, can be embedded. Further, the instructions 1724 may embody one or more of the methods or logic as described herein. In a particular embodiment, the instructions 1724 may reside completely, or at least partially, within the main memory 1704, the static memory 1706, and/or within the processor 1702 during execution by the computer system 1700. The main memory 1704 and the processor 1702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The computer-readable medium 1722 may include instructions 1724 or receives and executes instructions 1724 responsive to a propagated signal, so that a device connected to a network 1726 can communicate voice, video or data over the network 1726. Further, the instructions 1724 may be transmitted or received over the network 1726 via the network interface device 1720.

While the computer-readable medium 1722 is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium 1722 can include a solid-state memory such as a memory card or other package that houses one or more non-volatile read-only memories. Further, the computer-readable medium 1722 can be a random access memory or other volatile re-writable memory. Additionally, the computer-readable medium 1722 can include a magneto-optical or optical medium, such as a disk or tapes or other storage device. Accordingly, the disclosure is considered to include any one or more of a non-transitory computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTTP) represent examples of the state of the art. Such standards are periodically superseded by faster or more efficient equivalents having essentially the same functions.

Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
   forecasting, by a computer, demand for media content items available to a media distribution system based on historical demand information to generate forecasted demand;
   generating, by the computer, a mixed integer program model based on storage constraints of a plurality of distribution nodes of the media distribution system, bandwidth constraints of the media distribution system, and the forecasted demand, wherein each distribution node of the plurality of distribution nodes is associated with a corresponding set of a plurality of endpoints, wherein the bandwidth constraints include a particular bandwidth constraint for a link between a first distribution node of the plurality of distribution nodes and a second distribution node of the plurality of distribution nodes, the first distribution node associated with a first set of the plurality of endpoints and the second distribution node associated with a second set of the plurality of endpoints, the second set of the plurality of endpoints distinct from the first set of the plurality of endpoints;
   performing, by the computer, a Lagrangian relaxation operation using the mixed integer program model;
   determining, by the computer, values of a cost function, wherein the cost function is associated with an amount of bandwidth for the media distribution system to provide the media content items to each of the plurality of endpoints of the media distribution system, and wherein the values of the cost function are based on a result of the Lagrangian relaxation operation; and
   causing, by the computer, each of the media content items to be stored at a corresponding distribution node of the plurality of distribution nodes based on the cost function and the forecasted demand.

2. The method of claim 1, wherein forecasting the demand comprises:
   determining demand values for stored media content items based on a number of requests received during a particular time period to access each of the stored media content items, the stored media content items available through the media distribution system while the demand values are determined;
   assigning rank positions to the demand values based on a magnitude of each of the demand values;
   estimating a popularity order of a subset of the media content items for a time period for which the demand is being forecast; and
   assigning projected demand values to at least the subset of the media content items, wherein a particular projected demand value assigned to a first particular media content item is the demand value of a particular rank position that corresponds to a particular position in the popularity order of the first particular media content item, and wherein the forecasted demand is based on the projected demand values.

3. The method of claim 1, wherein the values of the cost function indicate that in response to the first distribution node receiving a request for a first media content item of the media content items from a first endpoint of the first set of the plurality of endpoints, the first distribution node accesses the first media content item from the second distribution node via the link.

4. The method of claim 3, wherein the values of the cost function indicate that in response to the second distribution node receiving a second request for a second media content item of the media content items from a second endpoint of the second set of the plurality of endpoints, the second distribution node accesses the second media content item from the first distribution node via the link.

5. The method of claim 1, further comprising sending a command to store a first particular media content item of the media content items at a particular distribution node, wherein the particular distribution node of the plurality of distribution nodes includes a first storage to store first media content items that are assigned to the particular distribution node and second storage to store a second media content item requested from a different distribution node of the plurality of distribution nodes to which the second media content item is assigned, and wherein the first particular media content item is stored in the first storage.

6. The method of claim 5, wherein the first storage is distinct from the second storage.

7. The method of claim 5, further comprising: determining, for the particular distribution node, whether any media content item is stored at the first storage of the particular distribution node that is not assigned to the particular distribution node, and when a second particular media content item is stored at the first storage of the particular distribution node and is not assigned to the particular distribution node, causing the second particular media content item to be deleted from the first storage of the particular distribution node.

8. The method of claim 5, wherein, in response to a particular endpoint sending a first request for a third particular media content item to the particular distribution node, the particular distribution node determines whether the particular media content item is stored at the first storage of the particular distribution node or at the second storage of the particular distribution node, and wherein, in response to the third particular media content item not being stored at the first storage or the second storage of the particular distribution node, the particular distribution node sends a second request for the third particular media content item to a second particular distribution node to which the third particular media content item is assigned and sends a second command to store the third particular media content item at the second storage of the particular distribution node.

9. The method of claim 5, wherein the second storage stores multiple second media content items, and wherein the multiple second media content items are removed from the second storage in accordance with a least recently used removal procedure.

10. The method of claim 5, wherein the cost function is configured to conserve the amount of bandwidth used.

11. The method of claim 1, wherein the Lagrangian relaxation operation is performed on the mixed integer program model for the storage constraints of the plurality of distribution nodes and the bandwidth constraints of the media distribution system.

12. The method of claim 1, wherein the link comprises a second link between the first distribution node and a third distribution node of the plurality of distribution nodes and a third link between the third distribution node and the second distribution node, and wherein the particular bandwidth constraint for the link is based on a first bandwidth constraint for the second link and a second bandwidth constraint for the third link.

13. The method of claim 1, wherein the media content items include a first set of video content items having a first viewing length and a second set of video content items having a second viewing length, wherein the first viewing length is less than the second viewing length, and wherein first forecasted demand that corresponds to the first set of video content items is forecast independently of second forecasted demand that corresponds to the second set of video content items.

14. The method of claim 1, further comprising, prior to forecasting demand, receiving data identifying new media content items, wherein the historical demand information corresponds to stored media content items, and wherein demand is forecast for the new media content items and the stored media content items.

15. A system comprising:
a processor; and
memory accessible to the processor, the memory comprising instructions that, when executed by the processor, cause the processor to perform operations comprising:
forecasting demand for media content items available to a media distribution system based on historical demand information to generate forecasted demand;
generating a mixed integer program model based on storage constraints of a plurality of distribution nodes of the media distribution system, bandwidth constraints of the media distribution system, and the forecasted demand, wherein each distribution node of the plurality of distribution nodes is associated with a corresponding set of a plurality of endpoints, wherein the bandwidth constraints include a particular bandwidth constraint for a link between a first distribution node of the plurality of distribution nodes and a second distribution node of the plurality of distribution nodes, wherein the first distribution node is associated with a first set of endpoints of the plurality of endpoints, and wherein the second distribution node is associated with a second set of endpoints of the plurality of endpoint, the second set of endpoints distinct from the first set of endpoints;
performing a Lagrangian relaxation operation using the mixed integer program model;
determining values of a cost function, wherein the cost function is associated with an amount of bandwidth for the media distribution system to provide the media content items to each of the plurality of endpoints of the media distribution system, and wherein the values of the cost function are based on a result of the Lagrangian relaxation operation; and
causing each of the media content items to be stored at a corresponding distribution node of the plurality of distribution nodes based on the cost function and the forecasted demand.

16. The system of claim 15, wherein the particular bandwidth constraint corresponds to bandwidth of data communicated from the first distribution node to the second distribution node, wherein the bandwidth constraints include a second particular bandwidth constraint for a second link between the first distribution node and the second distribution node, wherein the second particular bandwidth constraint corresponds to bandwidth of data communicated from the second distribution node to the first distribution node, and wherein the particular bandwidth constraint is distinct from the second particular bandwidth constraint.

17. The system of claim 15, wherein the media content items are assigned based on network modification data describing a physical modification or a logical modification to the media distribution system and wherein the media content items include video on demand content.

18. A computer-readable storage device comprising instructions executable by a processor to perform operations comprising:
forecasting demand for media content items available to a media distribution system based on historical demand information to generate forecasted demand;
generating a mixed integer program model based on storage constraints of a plurality of distribution nodes of the media distribution system, bandwidth constraints of the media distribution system, and the forecasted demand, wherein each distribution node of the plurality of distribution nodes is associated with a corresponding set of a plurality of endpoints, wherein the bandwidth constraints include a particular bandwidth constraint for a link between a first distribution node of the plurality of distribution nodes and a second distribution node of the plurality of distribution nodes, wherein the first distribution node is associated with a first set of endpoints of the plurality of endpoints, and wherein the second distribution node is associated with a second set of endpoints of the plurality of endpoint, the second set of endpoints distinct from the first set of endpoints;

performing a Lagrangian relaxation operation using the mixed integer program model;

determining values of a cost function, wherein the cost function is associated with an amount of bandwidth for the media distribution system to provide the media content items to each of the plurality of endpoints of the media distribution system, and wherein the values of the cost function are based on a result of the Lagrangian relaxation operation; and causing each of the media content items to be stored at a corresponding distribution node of the plurality of distribution nodes based on the cost function and the forecasted demand.

19. The computer-readable storage device of claim 18, wherein operations further comprise sending a command to store a first particular media content item of the media content items at a particular distribution node.

20. The computer readable storage device of claim 18, wherein the forecasted demand is based on a type of content associated with a subset of the media content items.

* * * * *